US008686971B2

(12) United States Patent
Kunii et al.

(10) Patent No.: US 8,686,971 B2
(45) Date of Patent: Apr. 1, 2014

(54) LIQUID CRYSTAL DISPLAY DEVICE AND A METHOD OF MANUFACTURING THE SAME

(75) Inventors: Masafumi Kunii, Kanagawa (JP); Ryoichi Ito, Kanagawa (JP); Masanobu Ikeda, Kanagawa (JP)

(73) Assignee: Japan Display West Inc., Aichi (JP)

( * ) Notice: Subject to any disclaimer, the term of this patent is extended or adjusted under 35 U.S.C. 154(b) by 951 days.

(21) Appl. No.: 12/368,632

(22) Filed: Feb. 10, 2009

(65) Prior Publication Data

US 2009/0207153 A1      Aug. 20, 2009

(30) Foreign Application Priority Data

Feb. 20, 2008   (JP) ................................. 2008-039013

(51) Int. Cl.
   *G06F 3/042*   (2006.01)
(52) U.S. Cl.
   USPC .......................... 345/175; 345/104; 178/18.09
(58) Field of Classification Search
   USPC .................. 345/173–180, 104; 349/115, 116; 178/18.01–18.11
   See application file for complete search history.

(56) References Cited

U.S. PATENT DOCUMENTS

| | | | |
|---|---|---|---|
| 6,214,684 B1 | 4/2001 | Shoji | |
| 2002/0008828 A1 | 1/2002 | Park et al. | |
| 2005/0264731 A1 | 12/2005 | Itou | |
| 2006/0022593 A1* | 2/2006 | Kim | 313/512 |
| 2006/0146038 A1* | 7/2006 | Park et al. | 345/173 |
| 2006/0169989 A1* | 8/2006 | Bhattacharya et al. | 257/79 |
| 2006/0279690 A1 | 12/2006 | Yu | |
| 2007/0132381 A1* | 6/2007 | Hayashi et al. | 313/512 |
| 2007/0170846 A1* | 7/2007 | Choi et al. | 313/504 |
| 2007/0229749 A1 | 10/2007 | Kaneko et al. | |
| 2008/0074401 A1* | 3/2008 | Chung et al. | 345/175 |

FOREIGN PATENT DOCUMENTS

| | | |
|---|---|---|
| JP | 11-008741 | 1/1999 |
| JP | 2002-82357 | 3/2002 |
| JP | 2004-318819 | 11/2004 |
| JP | 2005-275644 | 10/2005 |
| JP | 2006-003857 | 1/2006 |
| JP | 2006-091708 | 4/2006 |
| JP | 2007-128497 | 5/2007 |

(Continued)

OTHER PUBLICATIONS

Japanese Office Action issued on Mar. 21, 2012, in connection with counterpart JP Application No. 2008-039013.

(Continued)

*Primary Examiner* — Lun-Yi Lao
*Assistant Examiner* — Insa Sadio
(74) *Attorney, Agent, or Firm* — Dentons US LLP

(57) ABSTRACT

Disclosed herein is a liquid crystal display device including a liquid crystal panel having a first substrate, a second substrate facing the first substrate, a liquid crystal layer disposed between the first substrate and the second substrate, and first and second electrodes formed on a surface side, of the first substrate, facing the second substrate, a transverse electric field being applied to the liquid crystal layer through the first and second electrodes, thereby displaying an image in a pixel area; wherein the first substrate includes: a light receiving element provided on the surface, of the first substrate, facing the second substrate, for receiving an incident light on a light receiving surface thereof, thereby forming data on the received light; and a planarizing film provided on the surface side, of the first substrate, facing the second substrate so as to cover the light receiving element.

1 Claim, 28 Drawing Sheets

(56) References Cited

FOREIGN PATENT DOCUMENTS

| JP | 2007-226200 | 9/2007 |
|---|---|---|
| JP | 2007-264231 | 10/2007 |
| JP | 2007-322761 | 12/2007 |
| JP | 2008-021208 | 1/2008 |
| JP | 2008-33311 | 2/2008 |
| JP | 2008-233789 | 10/2008 |
| JP | 2008-298815 | 12/2008 |
| TW | 200643518 | 12/2006 |
| WO | 2005/104234 | 11/2005 |

OTHER PUBLICATIONS

Japanese Office Action entitled Decision of Refusal issued in connection with related Japanese patent application No. JP 2008-039013 dated Aug. 6, 2013.

Taiwanese Office Action dated Mar. 27, 2013 issued in connection with counterpart Taiwanese Patent Application No. 098100960.

* cited by examiner

FIG.6
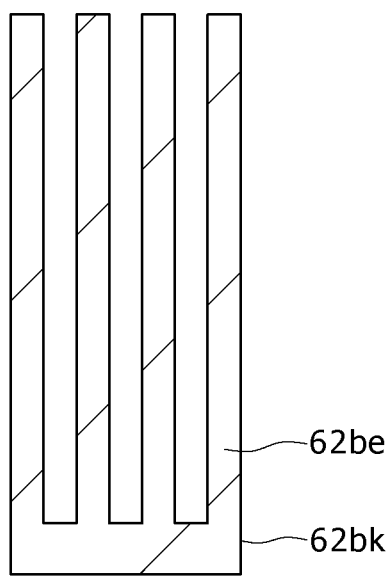
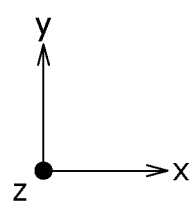

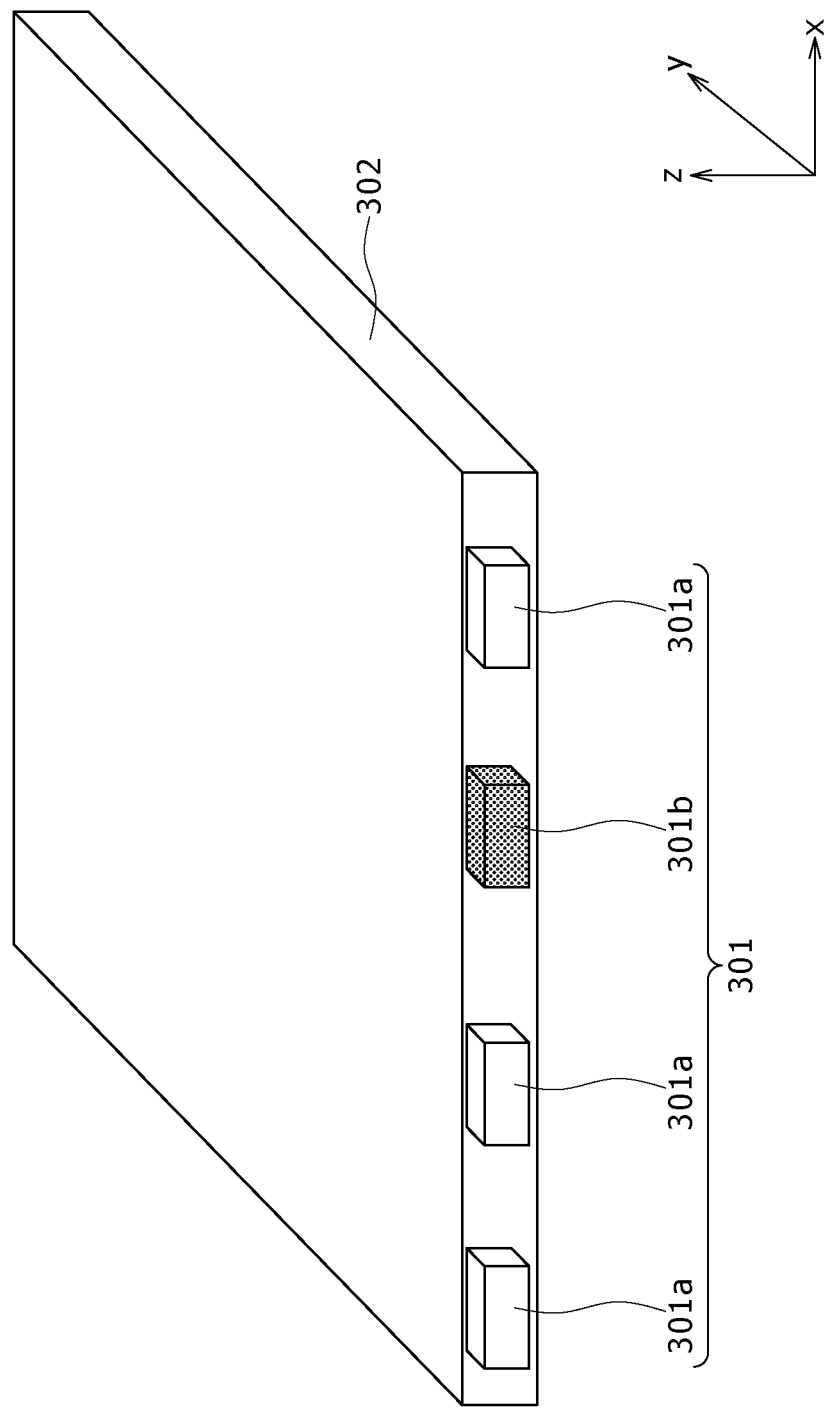

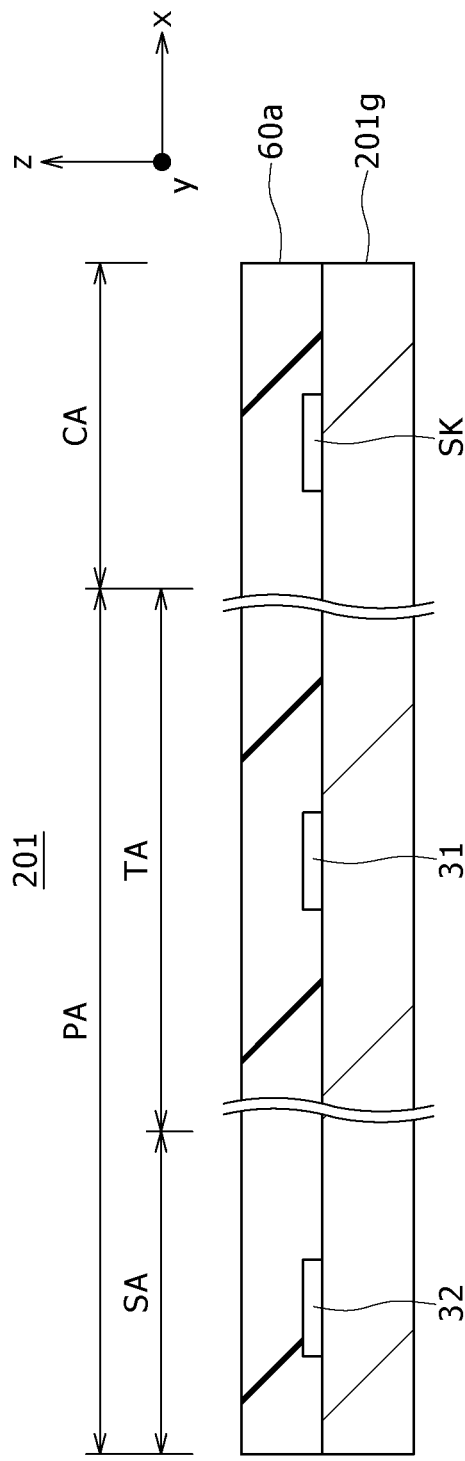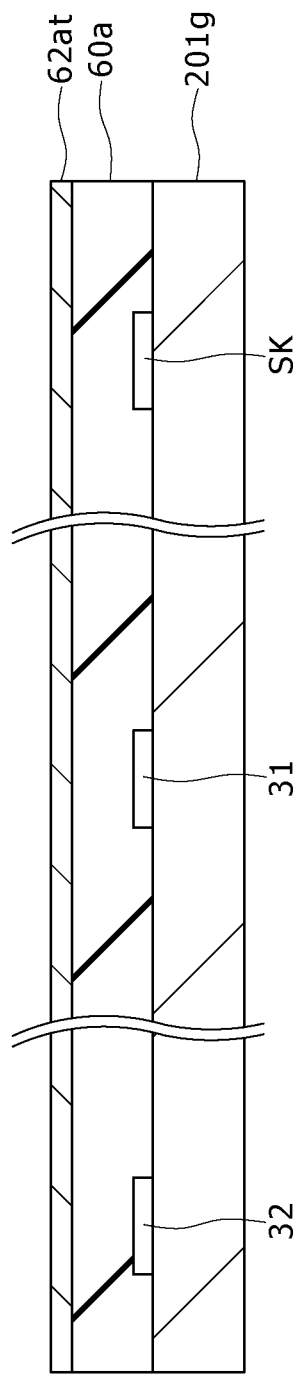

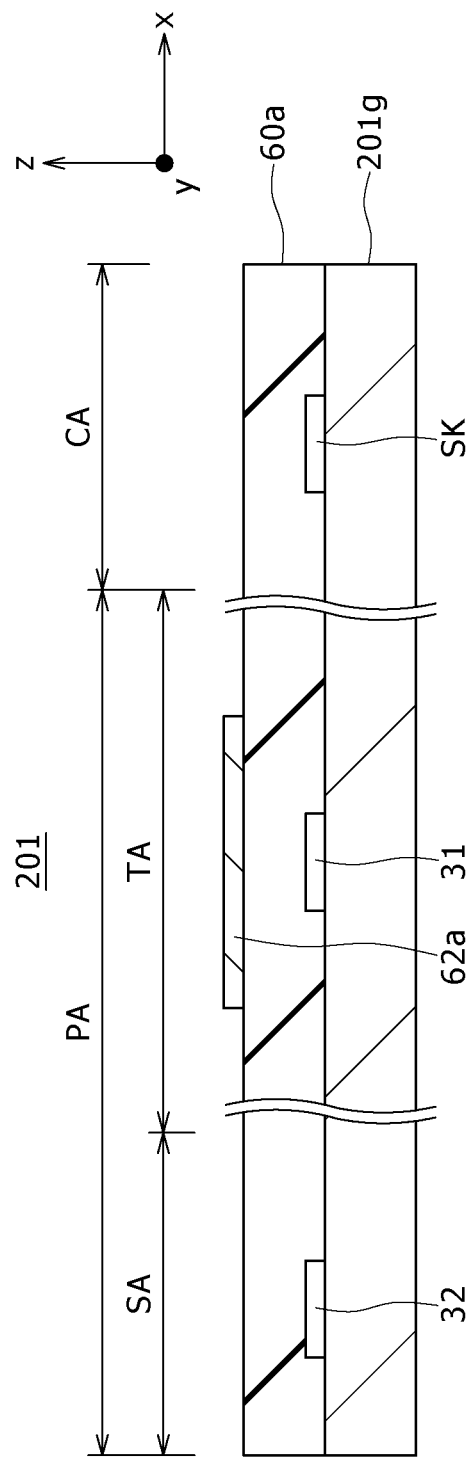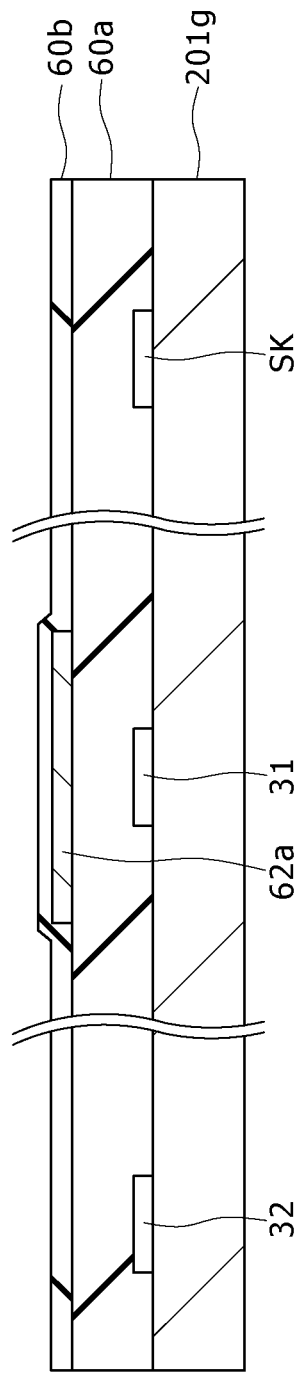

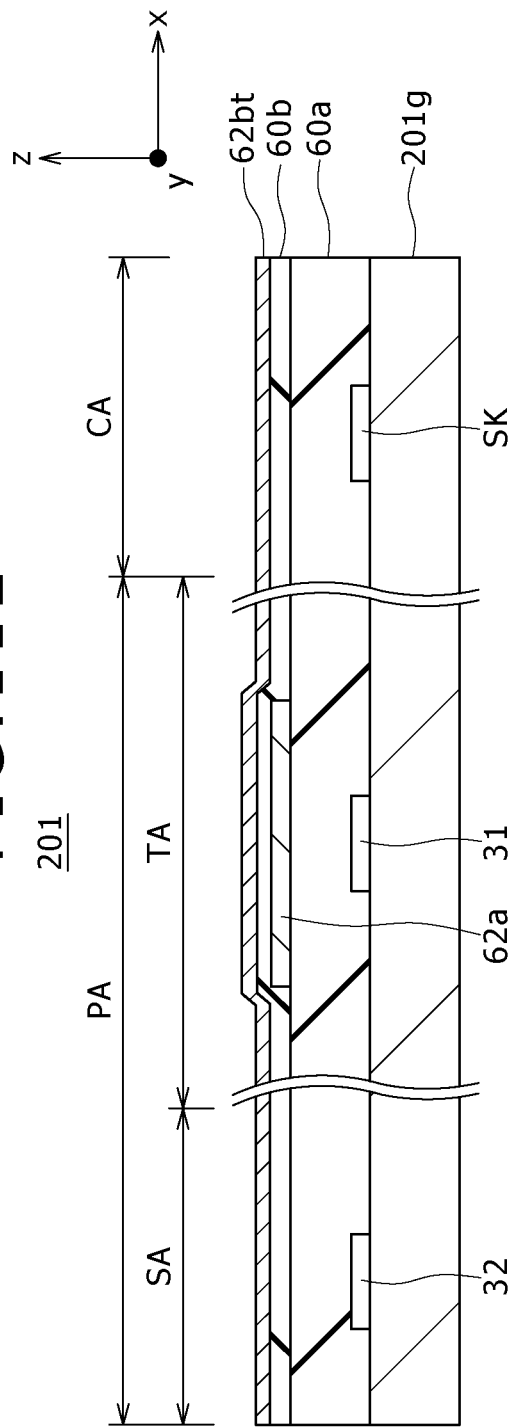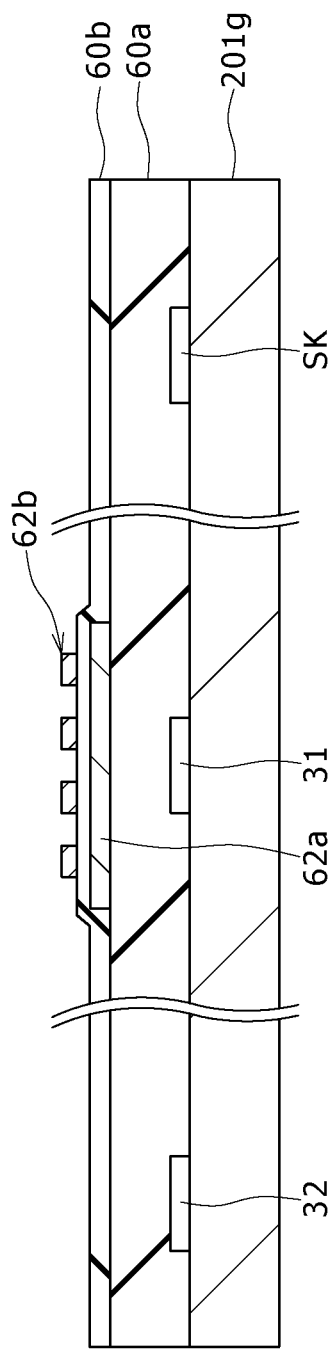

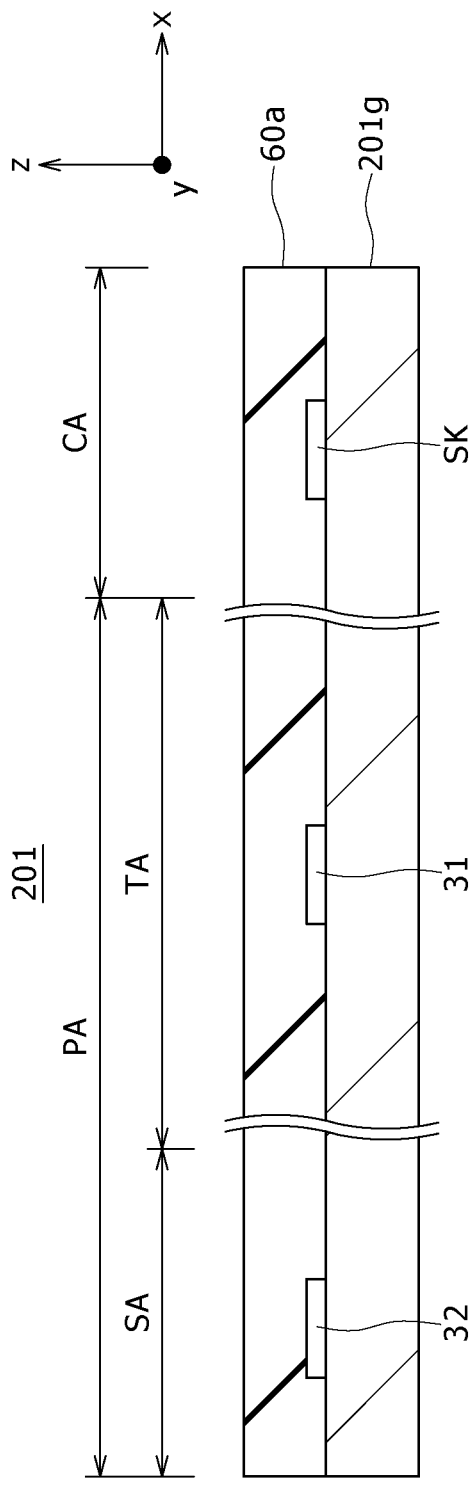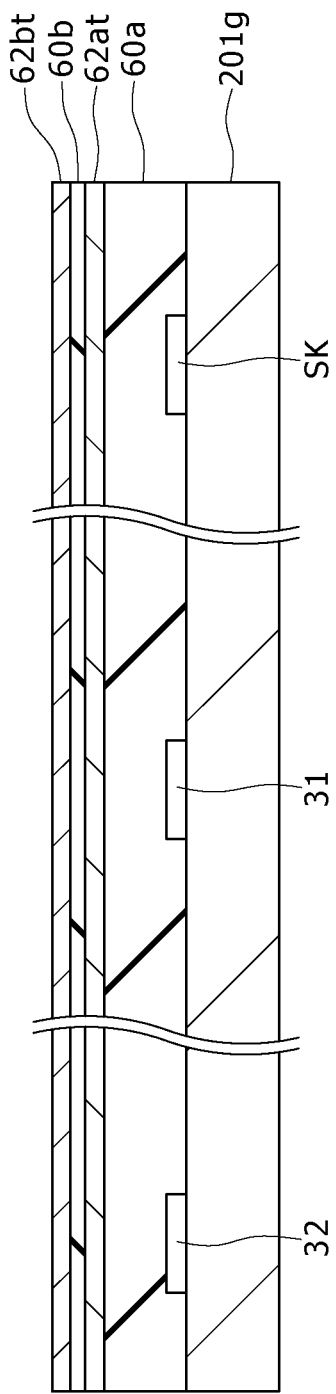

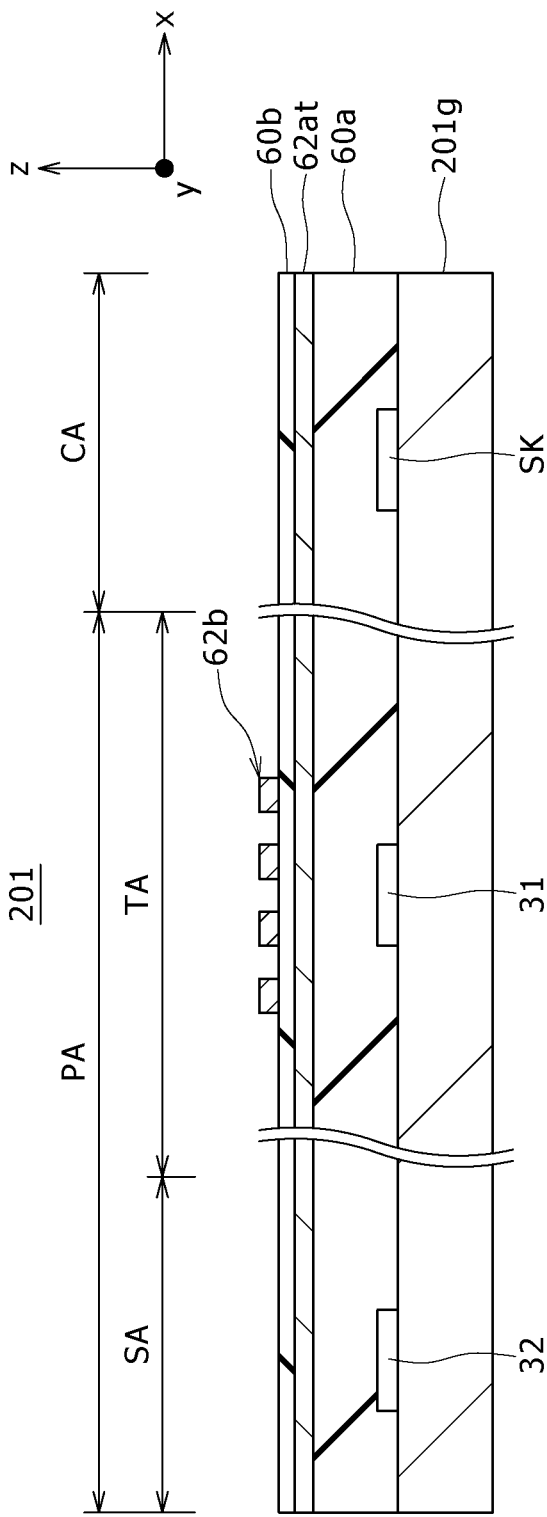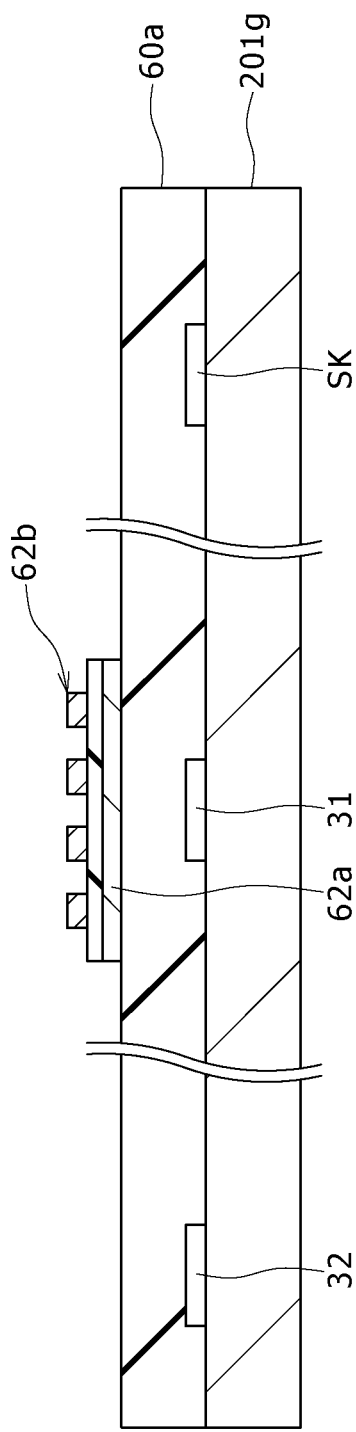

LIQUID CRYSTAL DISPLAY DEVICE AND A METHOD OF MANUFACTURING THE SAME

CROSS REFERENCES TO RELATED APPLICATIONS

The present invention contains subject matter related to Japanese Patent Application JP 2008-039013 filed in the Japan Patent Office on Feb. 20, 2008, the entire contents of which being incorporated herein by reference.

BACKGROUND OF THE INVENTION

1. Field of the Invention

The present invention relates to a liquid crystal display device and a method of manufacturing the same. More particularly, the invention relates to a liquid crystal display device which includes a liquid crystal panel having a pair of substrates facing each other, a liquid crystal layer disposed between sides, of the pair of substrates, facing each other, and a pair of electrodes formed on a surface side, of one substrate, facing the other substrate, a transverse electric field being applied to the liquid crystal layer through the pair of electrodes, thereby displaying an image in a pixel area, in which a light receiving element is formed on a surface, of the one substrate, facing the other substrate, and a method of manufacturing the same. In this case, the light receiving element receives an incident light made incident from the side of the other substrate to the side of the one substrate through the liquid crystal layer on a light receiving surface thereof, thereby generating data on the received light.

2. Description of the Related Art

A liquid crystal display device includes a liquid crystal panel having a liquid crystal layer enclosed between a pair of substrates as a display panel. The liquid crystal panel, for example, is of a transmission type, and modulates and transmits a radiation light emitted from a radiation device such as a backlight provided on a back surface thereof. Also, an image is displayed on a front surface of the liquid crystal panel based on the radiation light thus modulated.

The liquid crystal panel, for example, utilizes an active matrix system. Thus, the liquid crystal panel includes a TFT (Thin Film Transistor) array substrate, a counter substrate, and a liquid crystal layer. In this case, a plurality of TFTs each serving as a pixel switching element are formed in a pixel area of the TFT array substrate. The counter substrate is disposed so as to face the TFT array substrate. Also, the liquid crystal layer is disposed between the TFT array substrate and the counter substrate.

In the liquid crystal panel utilizing the active matrix system, a potential is applied to a pixel electrode through the pixel switching element to apply an electric field generated across the pixel electrode and a common electrode, thereby changing an orientation of liquid crystal molecules of the liquid crystal layer. As a result, a transmittance of each of lights transmitted through the pixels, respectively, is controlled, and the lights thus transmitted are modulated, thereby displaying an image.

In such a liquid crystal panel, there are known various display modes such as a Twisted Nematic (TN) mode, an Electrically Controlled Birefringence (ECB) mode, and a vertical orientation mode. In addition thereto, a Fringe Field switching (FFS) system, or an In-Plane-Switching (IPS) system, and the like are known as modes with each of which a transverse electric field is applied to the liquid crystal layer. In each mode with which the transverse electric field is applied to the liquid crystal layer, there is no dielectric anisotropy of the liquid crystal modules when viewed in a direction of the gaze, and thus it is possible to realize the suitable wide viewing angle. This technique, for example, is described in Japanese Patent Laid-Open No. 2007-226200.

A liquid crystal display device is proposed in which in the liquid crystal panel as described above, in addition to a semiconductor element such as a TFT serving as a pixel switching element, a light receiving element for receiving a light to obtain data on the received light is built in a pixel area. For example, PIN (P-intrinsic-N) type photodiodes are integrated as the light receiving elements in the pixel area. This technique, for example, is described in Japanese Patent Laid-Open Nos. 2006-3857 and 2007-128497.

In the liquid crystal panel described above, the light receiving elements built therein are utilized as position sensing elements, thereby making it possible to realize a function as a user interface. In the liquid crystal panel of this type, it is unnecessary to specially provide an external touch panel utilizing a resistor film system or an electrostatic capacitance system on the front surface of the liquid crystal panel. Therefore, it is possible to reduce a cost of the liquid crystal display device, and it is possible to readily realize miniaturization and thinning of the liquid crystal display device. Moreover, when the touch panel utilizing the resistor film system or the electrostatic capacitance system is installed, the quality of the displayed image may be reduced because the touch panel may reduce a quantity of light transmitted through the pixel area or may interfere with the light concerned. However, this problem can be prevented from being caused by building the light receiving elements as the position sensing elements in the liquid crystal panel in the manner as described above.

In the liquid crystal panel, for example, the radiation lights emitted from the backlight are transmitted through the liquid crystal panel, so that the light receiving element built in the liquid crystal panel receives a visible light obtained by reflecting the radiation lights from an object to be detected such as the finger of a user or a stylus pen which touches the front surface of the liquid crystal panel. After that, a coordinate position where the object to be detected touches the front surface of the liquid crystal panel is identified based on the data on the received light obtained from the light receiving element. Also, a manipulation corresponding to the coordinate position thus identified is carried out in the liquid crystal display device itself or in an electronic apparatus including the liquid crystal display device.

When the coordinate position of the object to be detected is detected by using the light receiving element built in the liquid crystal panel in the manner as described above, the data on the received light obtained from the light receiving element contains therein many noises due to an influence of the visible light contained in an outside light in some cases. In addition, when a dark image is displayed as in the case of black display, it is difficult for the light receiving element to receive the visible light because the visible light reflected by the object to be detected hardly reaches a light receiving surface of the light receiving element. Consequently, it is difficult to detect accurately the position of the object to be detected, in some cases.

In order to improve such a problem, a technique using an invisible light, such as an infrared light, other than the visible light is proposed. This technique, for example, is described in Japanese Patent Laid-Open Nos. 2004-318819 and 2005-275644.

With this technique, the light receiving element receives the invisible lights such as the infrared light emitted from the object to be detected to acquire the data on the received light, thereby identifying the position of the object to be detected based on the data on the received light thus acquired. In particular, it is preferable to use the infrared light because the finger of the human being has a high surface reflectivity in a wavelength of the infrared light.

SUMMARY OF THE INVENTION

In the case of the display mode with which the transverse electric field is applied to the liquid crystal layer as in the case of the FFS system or the IPS system, the electrodes paired with each other through which the transverse electric field is applied to the liquid crystal layer are both provided on the TFT array substrate. In this case, the electrodes paired are formed on a planarizing film formed so as to cover the semiconductor elements such as the pixel switching elements with an insulating film being interposed between them.

FIGS. 27A to 27D are respectively cross sectional views showing main portions of manufacturing processes in manufacturing a liquid crystal panel utilizing the FFS system. Referring to FIGS. 27A to 27D, in the manufacturing processes in manufacturing the liquid crystal panel utilizing the FFS system, manufacturing processes for manufacturing a TFT array substrate 201 are shown in the order of FIG. 27A, FIG. 27B, FIG. 27C, and FIG. 27D.

Firstly, as shown in FIG. 27A, semiconductor elements of a pixel switching element 31, a light receiving element 32, and a peripheral circuit element SK are formed on a surface of a glass substrate 201g.

In this case, for example, TFTs each having a bottom-gate structure using a semiconductor thin film made of polysilicon are formed as the pixel switching element 31 and the peripheral circuit element SK, respectively. In addition, a photodiode having a PIN structure is formed as the light receiving element 32.

Also, as shown in FIG. 27A, a planarizing film 60a is formed on a surface of the glass substrate 201g so as to cover the pixel switching element 31, the light receiving element 32, and the peripheral circuit element SK.

For example, the planarizing film 60a is made of an organic material such as an acrylic resin.

Next, as shown in FIG. 27B, a first transparent conductive film 62 at is formed.

In this case, the first transparent conductive film 62 at is made of a transparent conductive material such as an ITO (Indium Tin Oxide) so as to cover the planarizing film 60a.

Also, as shown in FIG. 27B, an insulating film 60b is formed.

In this case, for example, the insulating film 60b is formed from a silicon nitride film so as to cover the first transparent conductive film 62 at.

Moreover, as shown in FIG. 27B, a second transparent conductive film 62bt is formed.

In this case, the second transparent conductive film 62bt is made of a transparent conductive material such as the ITO so as to cover the insulating film 60b.

Next, as shown in FIG. 27C, a pixel electrode 62b is formed.

In this case, the second transparent conductive film 62bt is patterned by utilizing a lithography technique, thereby forming the pixel electrode 62b. Specifically, the pixel electrode 62b is formed so as to correspond to an area having the pixel switching element 31 formed therein on the surface of the glass substrate 201g. For example, the second transparent conductive film 62bt is patterned so as to have a pectinated planar structure by utilizing wet etching processing, thereby forming the pixel electrode 62b.

Next, as shown in FIG. 27D, the insulating film 60b is patterned.

In this case, the insulating film 60b is patterned by utilizing the lithography technique so that a portion of the insulating film 60b is left in an area having the pixel switching element 31 formed therein, and portions of the insulating film 60b corresponding to areas having the light receiving element 32 and the peripheral circuit element SK formed therein, respectively, are removed above the surface of the glass substrate 201g. Specifically, the insulating film 60b is patterned by utilizing dry etching processing. For example, the insulating film 60b is patterned by using a sulfur hexafluoride ($SF_6$) gas diluted with argon (Ar) under the conditions in which a pressure is in the range of 0.5 to 15 Pa, a power is in the range of 1,500 to 5,000 W, a stage temperature is in the range of 0 to 30° C., and an etching time is in the range of 30 to 60 seconds.

Also, as shown in FIG. 27D, a common electrode 62a is formed.

In this case, the first transparent conductive film 62 at is patterned, thereby forming the common electrode 62a. Specifically, the common electrode 62a is formed so as to have the same shape as that of the insulating film 60b above the surface of the glass substrate 201g. For example, the first transparent conductive film 62 at is patterned by carrying out the wet etching processing, thereby forming the common electrode 62a.

Also, the TFT array substrate 201 having the portions formed thereon, and the counter substrate 202 are stuck to each other. In this case, before the TFT array substrate 201 and the counter substrate 202 are stuck to each other, oriented films are subjected to rubbing processing after the oriented films, for example, each made of polyimide are formed on the TFT array substrate 201 and the counter substrate 202, respectively. Also, the TFT array substrate 201 and the counter substrate 202 are stuck to face each other so as to leave a space between them. After that, the liquid crystal is injected into the space defined between the TFT array substrate 201 and the counter substrate 202, and the liquid crystal layer is oriented, thereby forming the liquid crystal panel. Also, planarizing plates, and peripheral devices such as a backlight are mounted to the liquid crystal panel, thereby completing the liquid crystal display device.

As has been described, in the liquid crystal panel utilizing the FFS system, both the pixel electrode 62b and the common electrode 62a are provided on the TFT array substrate 201. Also, the insulating film 60b is interposed between the pixel electrode 62b and the common electrode 62a.

In the liquid crystal panel described above, the portion of the insulating film 60b corresponding to a sensor area SA having the light receiving element 32 formed therein is removed by carrying out the dry etching processing. For this reason, there may be caused a problem that the light receiving element 32 is damaged by the plasma in the dry etching processing, and thus the optical sensitivity of the light receiving element 32 is deteriorated, thereby increasing a dark current.

In particular, when the insulating film 60b is formed from a silicon nitride film, a manufacturing efficiency is reduced because an etching rate in the wet etching processing is low. In addition, the residues are left on the planarizing film 60a, and thus an S/N (Signal to Noise) ratio of the data on the received light obtained from the light receiving element is reduced in some cases. In order to cope with this situation, the insulating film 60b formed from the silicon nitride film is patterned by carrying out the dry etching processing instead of carrying out the wet etching processing in many cases. As a result, the causing of the problem described above may be actualized.

In the light of the foregoing, it is therefore desirable to provide a liquid crystal display device which is capable of increasing an optical sensitivity of a light receiving element, thereby suppressing generation of a dark current, and a method of manufacturing the same.

In order to attain the desire descried above, according to an embodiment of the present invention, there is provided a liquid crystal display device including a liquid crystal panel having a first substrate, a second substrate facing the first substrate, a liquid crystal layer disposed between the first substrate and the second substrate, and first and second electrodes formed on a surface side, of the first substrate, facing the second substrate, a transverse electric field being applied to the liquid crystal layer through the first and second electrodes, thereby displaying an image in a pixel area; in which the first substrate includes: a light receiving element provided on the surface, of the first substrate, facing the second substrate, for receiving an incident light made incident from a side of the second substrate to a side of the first substrate through the liquid crystal layer on a light receiving surface thereof, thereby forming data on the received light; and a planarizing film provided on the surface side, of the first substrate, facing the second substrate so as to cover the light receiving element; the first and second electrodes are provided on the planarizing film in the pixel area, an insulating film being interposed between the first and second electrodes; and the insulating film is provided in an area corresponding to a sensor area having the light receiving element provided therein on a surface of the planarizing film.

According to another embodiment of the present invention, there is provided a method of manufacturing a liquid crystal display device including a liquid crystal panel having a first substrate, a second substrate facing the first substrate, and a liquid crystal layer disposed between the first substrate and the second substrate, first and second electrodes through which a transverse electric field is applied to the liquid crystal layer in a pixel area being provided on a surface side, of the first substrate, facing the second substrate, the manufacturing method including the steps of: forming a light receiving element for receiving an incident light made incident from a side of the second substrate to a side of the first substrate through the liquid crystal layer in the pixel area on a light receiving surface thereof, thereby forming data on the received light on the surface, of the first substrate, facing the second substrate; forming a planarizing film covering the light receiving element in the pixel area on the surface, of the first substrate, facing the second substrate; and forming an insulating film interposed between the first and second electrodes in the pixel area on the surface, of the first substrate, facing the second substrate; in which in the step of forming the insulating film, the insulating film is formed in an area corresponding to a sensor area having the light receiving element provided therein on a surface of the planarizing film, and etching processing for removing the insulating film formed on the surface of the planarizing film in the sensor area is not carried out.

In the another embodiment of the present invention, the insulating film is formed on the surface of the planarizing film in the sensor area having the light receiving element provided therein in the pixel area, and the dry etching processing for removing the insulating film formed on the surface of the planarizing film in the sensor area is not carried out.

According to an embodiment of the present invention, it is possible to provide the liquid crystal display device which is capable of increasing an optical sensitivity of a light receiving element, thereby suppressing generation of a dark current, and the method of manufacturing the same.

BRIEF DESCRIPTION OF THE DRAWINGS

FIG. 6 is a top plan view showing a pixel electrode in the liquid crystal display device according to Embodiment 1 of the present invention;

FIG. 8 is a perspective view schematically showing a main portion of the backlight in the liquid crystal display device according to Embodiment 1 of the present invention;

FIGS. 11A to 11F are respectively cross sectional views showing main portions in manufacturing processes for manufacturing the liquid crystal panel in the liquid crystal display device according to Embodiment 1 of the present invention;

FIGS. 27A to 27D are respectively cross sectional views showing main portions of manufacturing processes when a liquid crystal panel in a related art utilizing an FFS system is manufactured.

DETAILED DESCRIPTION OF THE PREFERRED EMBODIMENTS

The preferred embodiments of the present invention will be described in detail hereinafter with reference to the accompanying drawings.

Embodiment 1

Structure of Liquid Crystal Display Device

Figure 1:
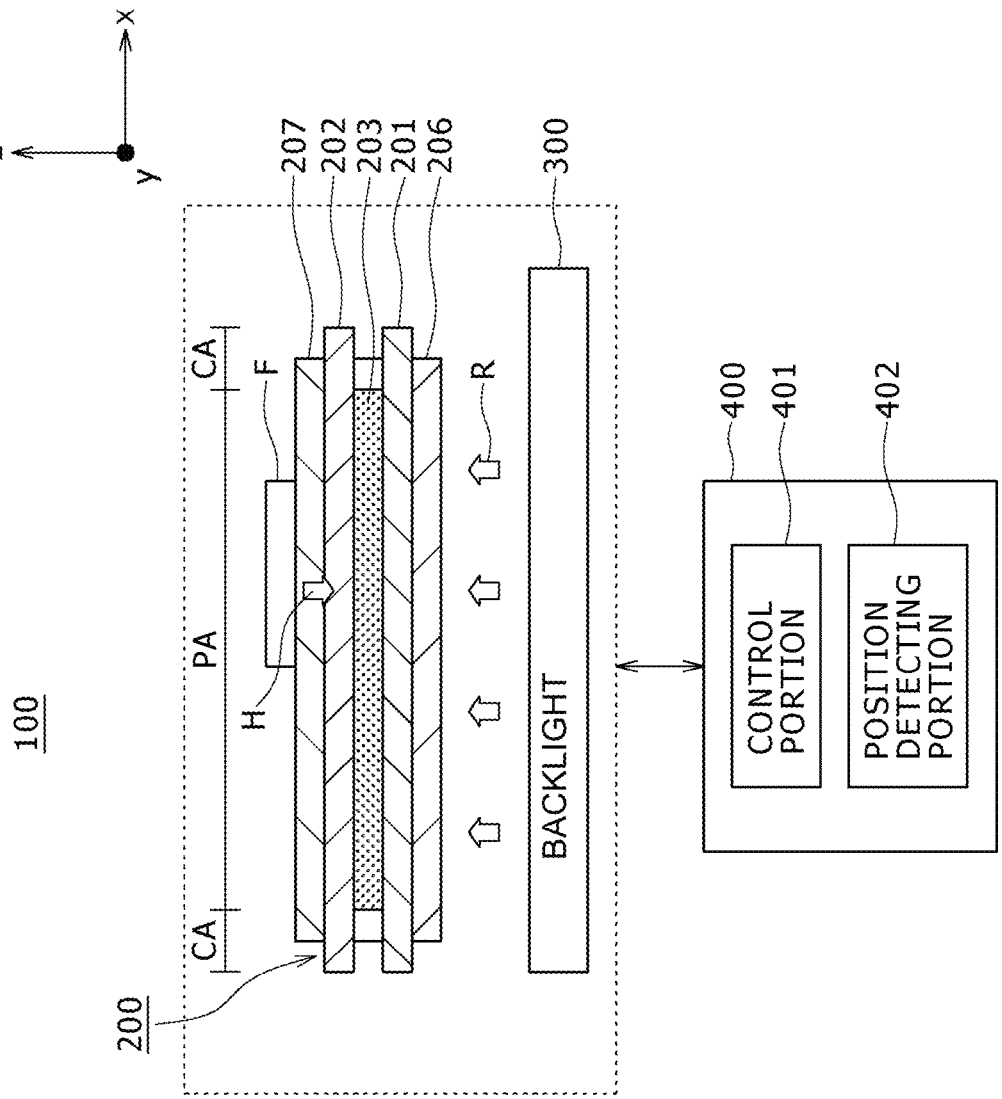
FIG. 1 is a schematic cross sectional view, partly in block, showing a structure of a liquid crystal display device according to Embodiment 1 of the present invention.

FIG. 1 is a cross sectional view showing a structure of a liquid crystal display device 100 according to Embodiment 1 of the present invention.

The liquid crystal display device 100 of Embodiment 1, as shown in FIG. 1, includes a liquid crystal panel 200, a backlight 300, and a data processing section 400. The liquid crystal panel 200, the backlight 300, and the data processing section 400 will be sequentially described.

The liquid crystal panel 200 utilizes an active matrix system, and, as shown in FIG. 1, includes a TFT array substrate 201, a counter substrate 202, and a liquid crystal layer 203.

In the liquid crystal panel 200, the TFT array substrate 201 and the counter substrate 202 face each other so as to leave a space between them. Also, the liquid crystal layer 203 is disposed so as to be sandwiched between the TFT array substrate 201 and the counter substrate 202.

Also, as shown in FIG. 1, the backlight 300 is disposed on the side of the TFT array substrate 201 in the liquid crystal panel 200. Radiation lights emitted from the backlight 300 are radiated to a surface, of the TFT array substrate 201, opposite to the surface of the TFT array substrate 201 facing the counter substrate 202.

Figure 2:
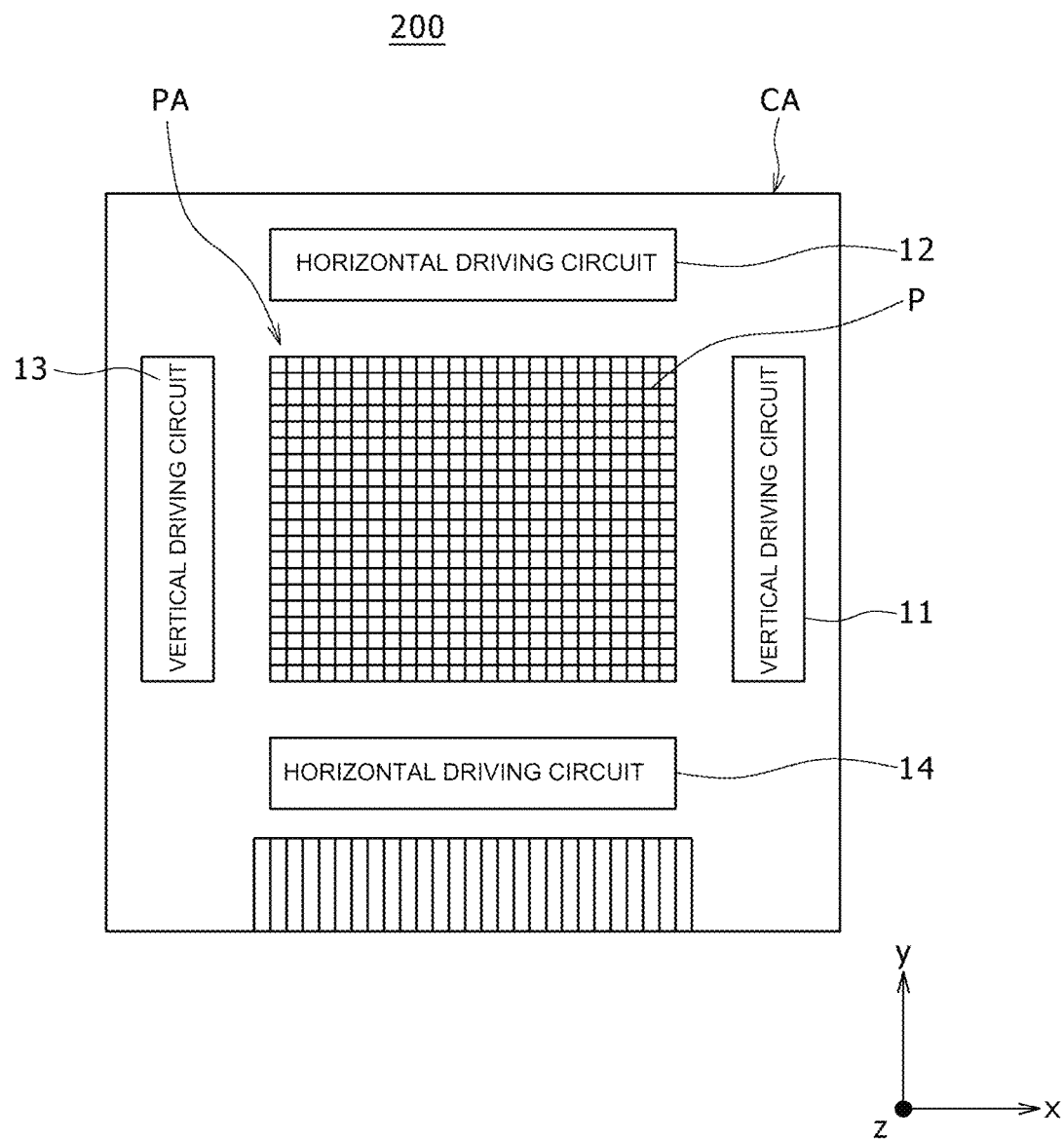
FIG. 2 is a schematic top plan view showing a liquid crystal panel in the liquid crystal display device according to Embodiment 1 of the present invention.

FIG. 2 is a schematic top plan view showing the liquid crystal panel 200 in the liquid crystal display device 100 according to Embodiment 1 of the present invention.

As shown in FIG. 2, the liquid crystal panel 200 includes a pixel area PA and a circumferential area CA.

As shown in FIG. 2, a plurality of pixels P are disposed along the surface in the pixel area PA in the liquid crystal panel 200. Specifically, the plurality of pixels P are disposed in a matrix along an x-direction and a y-direction vertical to the x-direction.

In the pixel area PA, the radiation lights R emitted from the backlight 300 installed on a back surface side of the liquid crystal panel 200 is received on a back surface of the liquid crystal panel 200, and the radiation lights R received on the back surface of the liquid crystal panel 200 are transmitted through a first polarizing plate 206. The radiation lights R transmitted through the liquid crystal panel 200 are transmitted through a second polarizing plate 207, thereby carrying out image display. That is to say, the liquid crystal panel 200 is of a transmission type.

In addition, the liquid crystal display device 100, for example, utilizes a normally black system, and the first polarizing plate 206 and the second polarizing plate 207 are disposed in the manner as will be described below. That is to say, when no voltage is applied to the liquid crystal layer 203 in the liquid crystal panel 200, a light transmittance decreases, thereby carrying out the black display. On the other hand, when the voltage is applied to the liquid crystal layer 203, the light transmittance increases, thereby carrying out the white display. For example, the first polarizing plate 206 and the second polarizing plate 207 are disposed in a way that their transmission axes are disposed in a cross-Nicol manner.

In addition, although details will be described later, the liquid crystal panel 200 of Embodiment 1 utilizes the FFS system, and pixel electrodes (not shown) and a common electrode (not shown) are formed on a surface side, of the TFT array substrate 201, facing the counter substrate 202. Also, liquid crystal molecules are horizontally oriented in the liquid crystal layer 203. For this reason, in the pixel area PA a transverse electric field is applied to the liquid crystal layer 203 through the pixel electrodes (not shown) and the common electrode (not shown) to change the orientation of the liquid crystal molecules of the liquid crystal layer 203 in a lengthy direction, thereby displaying an image.

Specifically, in the pixel area PA, a plurality of switching elements (not shown) are provided on the TFT array substrate 201 so as to correspond to a plurality of pixels P, respectively. Also, color filter layers (not shown) are provided on the counter substrate 202 so as to correspond to a plurality of pixels P, respectively. In the pixel area PA, the pixel switching elements switching-control the pixels P, respectively, thereby modulating the radiation lights made incident to the back surface of the liquid crystal panel 200 through the first polarizing plate 206. For example, TFTs each having a semiconductor thin film made of polysilicon are formed as the pixel switching elements and switching-control the pixels P, respectively. Also, the radiation lights R thus modulated are colored by the color filter layers, and are emitted from the front surface side of the liquid crystal panel 200 through the second polarizing plate 207, thereby displaying a color image in the pixel area PA.

In addition, a plurality of light receiving elements (not shown) are formed so as to correspond to a plurality of pixels P, respectively, in the pixel area PA in the liquid crystal display device 100 of Embodiment 1. For example, the plurality of light receiving elements are formed so as to include a plurality of photodiodes (not shown), respectively. Also, when an object F to be detected such as the finger of a user or a touch pen contacts or approaches the front surface as the side opposite to the back surface having the backlight 300 installed thereon in the liquid crystal panel 200, the corresponding ones of the light receiving elements receive a reflected light H from the object F to be detected, thereby generating data on the received light. That is to say, the corresponding ones of the light receiving elements receive the reflected light H traveling from the side of the counter substrate 202 to the side of the TFT array substrate 201 to photoelectrically convert the reflected light H thus received, thereby generating the data on the received light.

In the liquid crystal panel 200, as shown in FIG. 2, the circumferential area CA is located so as to surround the circumference of the pixel area PA. As shown in FIG. 2, a vertical driving circuit 11 for display, a horizontal driving circuit 12 for display, a vertical driving circuit 13 for a sensor, and a horizontal driving circuit 14 for a sensor are formed as peripheral circuits in the circumferential area CA. For example, the TFTs each having the semiconductor thin film made of polysilicon are formed as peripheral circuit elements composing these peripheral circuits similarly to the case of the pixel switching elements 31.

Also, the vertical driving circuit 11 for display, and the horizontal driving circuit 12 for display drive a plurality of pixel switches provided so as to correspond to the pixels P, respectively, in the pixel area PA, thereby carrying out the image display. Concurrently with this operation, the vertical driving circuit 13 for a sensor, and the horizontal driving circuit 14 for a sensor drive a plurality of light receiving elements (not shown) provided so as to correspond to the pixels P, respectively, in the pixel area PA, thereby collecting the data on the received light.

Specifically, the vertical driving circuit 11 for display is connected to each of the pixel switching elements formed so as to correspond to a plurality of pixels P, respectively, in a y-direction. Also, the vertical driving circuit 11 for display successively supplies a scanning signal to a plurality of pixel switching elements arranged in the y-direction in accordance with a control signal supplied thereto from a control portion 401 which will be described later. In this case, a plurality of gate lines (not shown) are connected to a plurality of pixel switching elements formed so as to correspond to a plurality of pixels P arranged in an x-direction, respectively. The plurality of gate lines are formed so as to correspond to a plurality of pixels P arranged in the vertical y-direction, respectively. The vertical driving circuit 11 for display supplies the scanning signal so as to successively select a plurality of gate lines.

The horizontal driving circuit 12 for display is connected to each of a plurality of pixel switching elements (not shown) formed so as to correspond to a plurality of pixels P, respectively, in the x-direction. Also, the horizontal driving circuit 12 for display successively supplies a video data signal to a plurality of pixel switching elements arranged in the x-direction in accordance with a control signal supplied thereto from the control portion 401 which will be described later. In this case, a plurality of signal lines (not shown) are connected to a plurality of pixel switching elements formed so as to correspond to a plurality of pixels P arranged in the vertical y-direction, respectively. A plurality of signal lines are formed so as to correspond to a plurality of pixels P disposed in the horizontal x-direction, respectively. The horizontal driving circuit 12 for display successively supplies the video data signal to a plurality of signal lines. Also, the video data signal is supplied to the liquid crystal layer 203 through the pixel switching elements to which the vertical driving circuit 11 for display successively supplies the scanning signal, thereby carrying out the image display.

The vertical driving circuit 13 for a sensor is connected to a plurality of light receiving elements (not shown) formed so as to correspond to a plurality of pixels P, respectively, in the y-direction. Also, the vertical driving circuit 13 for a sensor supplies the scanning signal so as to select the light receiving elements from which the data on the received light is read out from a plurality of light receiving elements arranged in the y-direction in accordance with a control signal supplied thereto from the control portion 401 which will be described later. In this case, a plurality of gate lines (not shown) are provided so as to correspond to a plurality of light receiving elements arranged in the x-direction, respectively. The plurality of gate lines (not shown) are formed so as to correspond to a plurality of light receiving elements arranged in the y-direction, respectively. The vertical driving circuit 13 for a sensor supplies the scanning signal so as to successively select a plurality of gate lines.

The horizontal driving circuit 14 for a sensor is connected to a plurality of light receiving elements (not shown) formed so as to correspond to a plurality of pixels P, respectively, in the x-direction. Also, the horizontal driving circuit 14 for a sensor successively reads out the data on the received light from a plurality of light receiving elements arranged in the x-direction in accordance with a control signal supplied thereto from the control portion 401 which will be described later. In this case, a plurality of signal lines (not shown) are connected to a plurality of receiving elements formed so as to correspond to a plurality of pixels P arranged in the y-direction, respectively. A plurality of signal lines are formed so as to correspond to a plurality of pixels P arranged in the x-direction, respectively. The horizontal driving circuit 14 for a sensor successively reads out the data on the received light from the light receiving elements through a plurality of signal lines, respectively. Specifically, the horizontal driving circuit 14 for a sensor successively reads out the data on the received light from the light receiving elements which are selected in accordance with the scanning signal supplied thereto from the vertical driving circuit 13 for a sensor.

As shown in FIG. 1, the backlight 300 faces the back surface of the liquid crystal panel 200, and radiates the radiation lights R to the back surface of the liquid crystal panel 200.

Specifically, the backlight 300 is disposed on the side of the TFT array substrate 201 composing the liquid crystal panel 200, and radiates the radiation lights R to the surface, of the TFT array substrate 201, opposite to the surface of the TFT array substrate 201 facing the counter substrate 202. That is to say, the backlight 300 radiates the radiation lights R so that the radiation lights R travel from the side of the TFT array substrate 201 to the side of the counter substrate 202.

The data processing section 400, as shown in FIG. 1, includes the control portion 401 and a position detecting portion 402. The data processing section 400 includes a computer and is configured in a way that the computer operates as the control portion 401 and the position detecting portion 402 in accordance with a program.

The control portion 401 of the data processing section 400 is configured so as to control the operations of the liquid crystal panel 200 and the backlight 300. The control portion 401 supplies the control signal to the liquid crystal panel 200, thereby controlling the operations of a plurality of switching elements (not shown) provided in the liquid crystal panel 200. For example, the control portion 401 causes the pixel switching elements of the liquid crystal panel 200 to carry out line-sequential drive. In addition, the control portion 401 supplies a control signal to the backlight 300 in accordance with a drive signal supplied thereto from the outside, thereby controlling the operation of the backlight 300. As a result, the backlight 300 radiates the radiation lights R to the back surface of the liquid crystal panel 200. The control portion 401 controls both the operations of the liquid crystal panel 200 and the backlight 300 in the manner described above, thereby displaying an image in the pixel area PA of the liquid crystal panel 200.

In addition thereto, the control portion 401 supplies a control signal to the liquid crystal panel 200 to control the operations of a plurality of light receiving elements (not shown) provided as the position sensing elements in the liquid crystal panel 200, thereby collecting the data on the received light from the plurality of light receiving elements. For example, the control portion 401 causes the pixel switching elements of the liquid crystal panel 200 to carry out the line-sequential drive, thereby successively collecting the data on the received light from the plurality of light receiving elements.

The position detecting portion 402 of the data processing section 400 detects a position where the object to be detected such as the finger of the user or the touch pen contacts or approaches the pixel area PA on the front surface side of the liquid crystal panel 200 based on the data on the received light collected from the plurality of light receiving element (not shown) provided in the liquid crystal panel 200. For example, the position detecting portion 402 detects a coordinate position where a strength of a signal about the data on the received light is larger than a reference value as a coordinate position where the object F to be detected contacts the pixel area PA.

(Structure of TFT Array Substrate)

Figure 3:
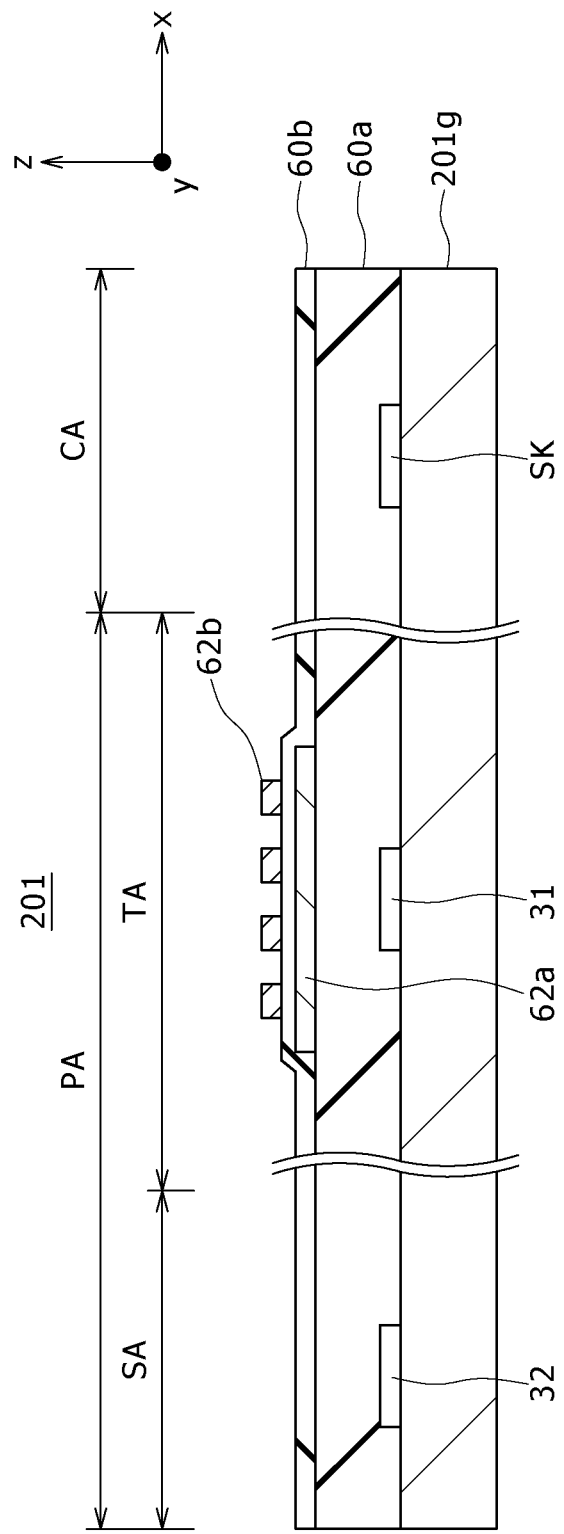
FIG. 3 is a cross sectional view schematically showing a main portion of a TFT array substrate in the liquid crystal display device according to Embodiment 1 of the present invention.

FIG. 3 is a cross sectional view schematically showing a main portion of the TFT array substrate 201 in the liquid crystal display device 100 according to Embodiment 1 of the present invention.

As shown in FIG. 3, the TFT array substrate 201 includes a glass substrate 201g. The glass substrate 201g is an insulating substrate which transmits a light, and is made of a glass. Also, a pixel switching element 31, a light receiving element 32, a peripheral circuit element SK, a planarizing film 60a, an insulating film 60b, a common electrode 62a, and a pixel electrode 62b, as shown in FIG. 3, are formed on the surface, of the glass substrate 201g, facing the counter substrate 202.

The pixel switching element 31, the light receiving element 32, the peripheral circuit element SK, the planarizing film 60a, the insulating film 60b, the common electrode 62a, and the pixel electrode 62b provided on the TFT array substrate 201 will now be described one by one.

The pixel switching element 31, as shown in FIG. 3, is formed in a display area TA of the pixel area PA.

Figure 4:
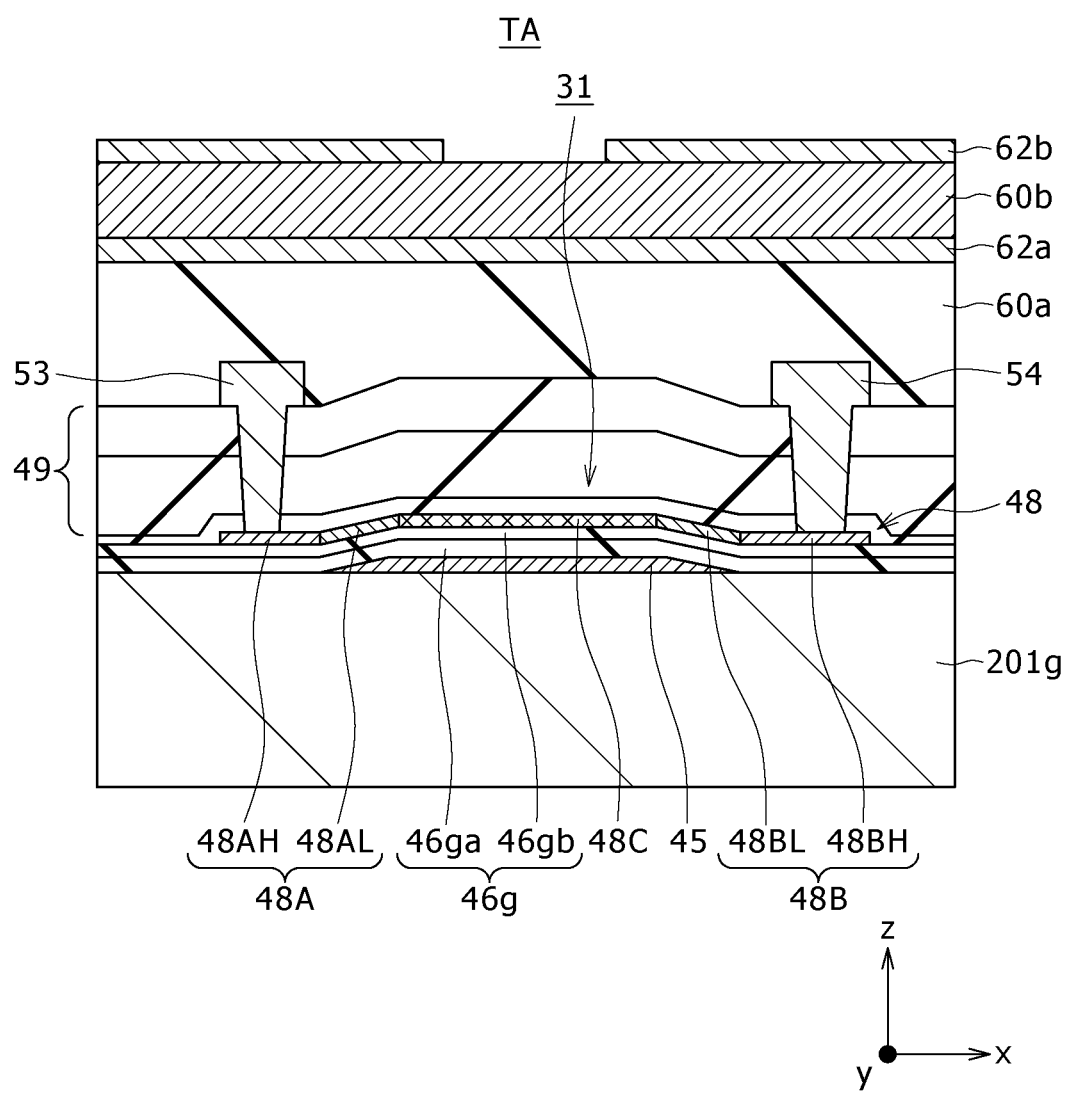
FIG. 4 is a cross sectional view showing a pixel switching element in the liquid crystal display device according to Embodiment 1 of the present invention.

FIG. 4 is a cross sectional view showing the pixel switching element 31 in the liquid crystal display device 100 according to Embodiment 1 of the present invention.

As shown in FIG. 4, the pixel switching element 31 includes a gate electrode 45, a gate insulating film 46g, and a semiconductor layer 48, and is formed in the form of a bottom-gate type TFT having a Lightly Doped Drain (LDD) structure. For example, the pixel switching element 31 is formed as an N-channel TFT.

Specifically, in the pixel switching element 31, the gate electrode 45 is made of a metallic material, such as molybdenum (Mo), titanium (Ti) or tantalum (Ta) to have a thickness of 60 to 90 nm. In this case, as shown in FIG. 4, the gate electrode 45 is provided on the surface of the glass substrate 201g so as to face a channel region 48C of the semiconductor layer 48 through the gate insulating film 46g.

In addition, in the pixel switching element 31, as shown in FIG. 4, the gate insulating film 46g is formed by, for example, laminating a silicon oxide film 46gb on a silicon nitride film 46ga so as to cover the gate electrode 45. In this case, for example, the silicon nitride film 46ga is formed to have a thickness of 40 nm, and the silicon oxide film 46gb is formed to have a thickness of 50 nm.

In addition, in the pixel switching element 31, the semiconductor layer 48, for example, is made of polysilicon. For example, the semiconductor layer 48 is formed from a polysilicon thin film having a thickness of 20 to 160 nm. As shown in FIG. 4, in the semiconductor layer 48, the channel region 48C is formed so as to correspond in position to the gate electrode 45, and a pair of source/drain regions 48A and 48B is formed so as to sandwich the channel region 48C between the source/drain regions 48A and 48B. In the pair of source/drain regions 48A and 48B, a pair of low impurity concentrated regions 48AL and 48BL are formed so as to sandwich the channel region 48C between the low impurity concentrated regions 48AL and 48BL. Moreover, a pair of high impurity concentrated regions 48AH and 48BH having higher impurity concentrations than those of the pair of low impurity concentrated regions 48AL and 48BL is formed so as to sandwich the pair of low impurity concentrated regions 48AL and 48BL between the high impurity concentrated regions 48AH and 48BH.

Also, in the pixel switching element 31, each of a source electrode 53 and a drain electrode 54 is made of a conductive material such as aluminum. In this case, as shown in FIG. 4, an interlayer insulating film 49 is provided so as to cover the semiconductor layer 48. Also, a conductive material is filled in a contact hole extending completely through the interlayer insulating film 49, and is then patterned, which results in that the source electrode 53 is provided so as to be electrically connected to one of the source/drain regions 48A. Also, similarly to the case of the source electrode 53, the conductive material is filled in the contact hole extending completely through the interlayer insulating film 49, and is then patterned, which results in that the drain electrode 54 is provided so as to be electrically connected to the other of the source/drain regions 48B.

The light receiving element 32, as shown in FIG. 3, is formed in the sensor area SA of the pixel area PA.

Figure 5:
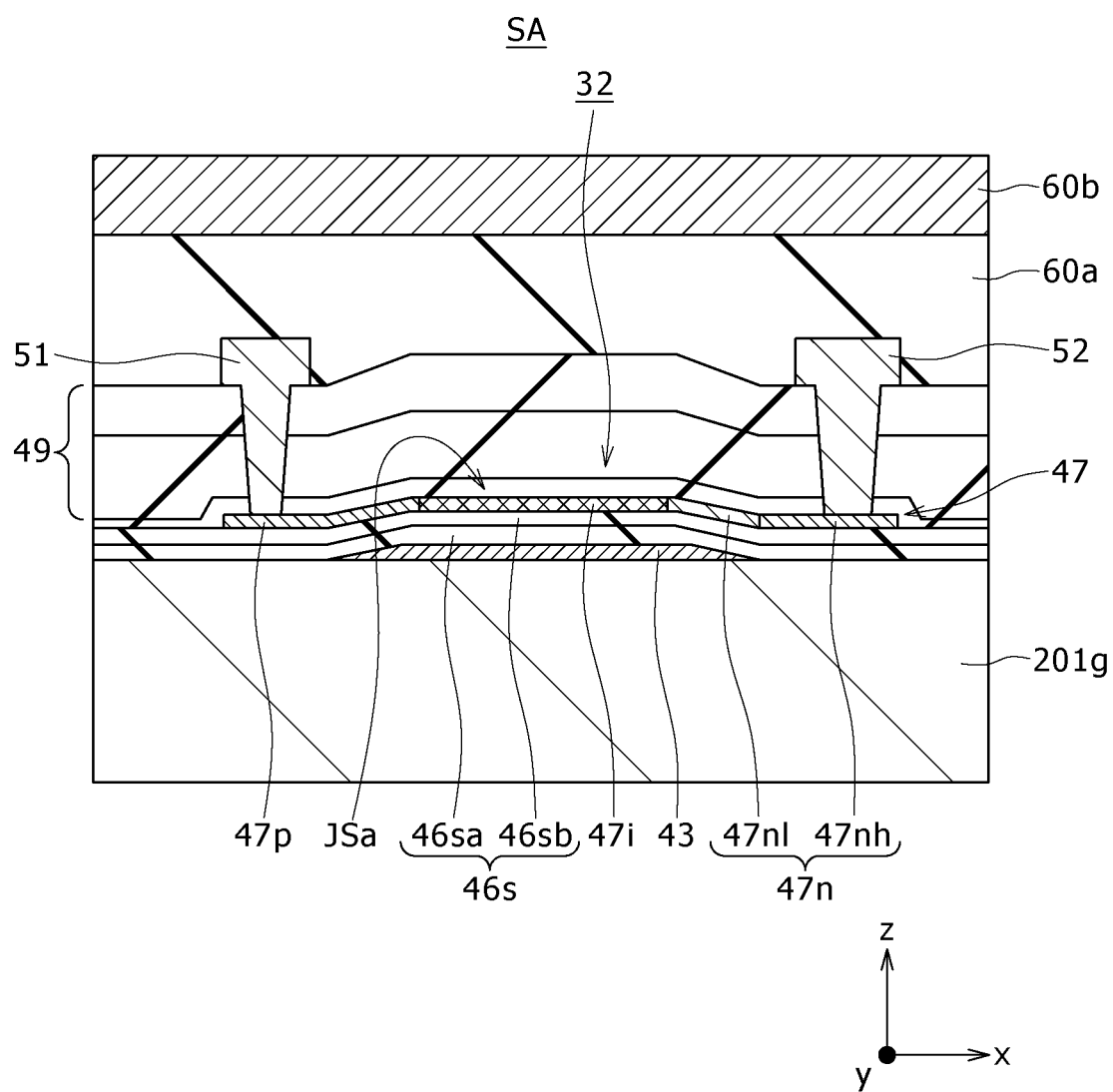
FIG. 5 is a cross sectional view showing a light receiving element in the liquid crystal display device according to Embodiment 1 of the present invention.

FIG. 5 is a cross sectional view showing the light receiving element 32 in the liquid crystal display device 100 according to Embodiment 1 of the present invention.

As shown in FIG. 5, the light receiving element 32 is a photodiode having a PIN structure, and includes a gate electrode 43, a gate insulating film 46s provided on the gate electrode 43, and a semiconductor layer 47 facing the gate electrode 43 through the gate insulating film 46s.

In the light receiving element 32, the gate electrode 43, for example, is made of a metallic material such as molybdenum, and has a function as a light shielding layer added thereto. In this case, as shown in FIG. 5, the gate electrode 43 is provided so as to face an i layer 47*i* of the semiconductor layer 47 through the gate insulating film 46*s* on the surface of the glass substrate 201*g*.

In addition, in the light receiving element 32, the gate insulating film 46*s* is formed by laminating a silicon oxide film 46*sb* on a silicon nitride 46*sa* so as to cover the gate electrode 43. In this case, for example, the silicon nitride film 46*sa* is formed to have a thickness of 40 nm, and the silicon oxide film 46*sb* is formed to have a thickness of 50 nm.

In addition, in the light receiving element 32, the semiconductor layer 47, for example, is made of polysilicon. For example, the semiconductor layer 47 is formed from a polysilicon thin film having a thickness of 20 to 160 nm. Also, as shown in FIG. 5, the semiconductor layer 47 includes a p layer 47*p*, an n layer 47*n*, and the layer 47*i*. In this case, the semiconductor layer 47 is provided so that the i layer 47*i* having a high resistance value is interposed between the p layer 47*p* and the n layer 47*n*. The p layer 47*p*, for example, is doped with p-type impurity ions such as boron ions. In addition, the i layer 47*i* is a photoelectric conversion layer, and has a light receiving surface JSa for receiving a light to carry out the photoelectric conversion. In addition, the n layer 47*n* is doped with n-type impurity ions such as phosphorus ions. In this case, for reduction of a leakage current, the n layer 47*n* includes a high impurity concentrated region 47*nh* doped with n-type impurity ions at a high concentration, and a low impurity concentrated region 47*nl* doped with n-type impurity ions at a lower concentration than that in the high impurity concentrated region 47*nh*. Also, the n layer 47*n* is formed in a way that the low impurity concentrated region 47*nl* is interposed between the high impurity concentrated region 47*nh* and the i layer 47*i*.

Also, in the light receiving element 32, each of an anode electrode 51 and a cathode electrode 52 is made of aluminum. In this case, as shown in FIG. 5, the interlayer insulating film 49 is provided so as to cover the semiconductor layer 47. The conductive material is filled in the contact hole extending completely through the interlayer insulating film 49, and is then patterned, which results in that the anode electrode 51 is provided so as to be electrically connected to the p layer 47*p*. Similarly to the case of the anode electrode 51, the conductive material is filled in the contact hole extending completely through the interlayer insulating film 49, and is then patterned, which results in that the cathode electrode 52 is provided so as to be electrically connected to the n layer 47*n*.

The peripheral circuit element SK, as shown in FIG. 3, is formed in the circumferential area CA.

The peripheral circuit element SK is formed in the form of a bottom-gate type TFT similarly to the case of the pixel switching element 31. For example, the peripheral circuit element SK is formed as a P-channel TFT.

The planarizing film 60*a*, as shown in FIG. 3, is formed over the pixel area PA and the circumferential area CA. In this case, the planarizing film 60*a* is formed on the surface of the glass substrate 201*g* so as to cover the pixel switching element 31, the light receiving element 32, and the peripheral circuit element SK. Thus, the planarizing film 60*a* carries out the planarization so that a surface thereof extends along the surface of the glass substrate 201*g*. For example, an acrylic system resin is deposited to have a thickness of 1 to 3 μm, thereby forming the planarizing film 60*a*.

The insulating film 60*b*, as shown in FIG. 3, is formed over the pixel area PA and the circumferential area CA. That is to say, the insulating film 60*b* is provided in an area corresponding to the sensor area SA having the light receiving element 32 provided therein on the surface of the planarizing film 60*a*. In addition, the insulating film 60*b* is also provided in an area corresponding to the display area TA having the pixel switching element 31 formed therein on the surface of the planarizing film 60*a* so as to cover the common electrode 62*a*. The insulating film 60*b* is formed from a silicon oxide film, a silicon nitride film or a silicon oxynitride ($SiO_xN_y$) film.

The common electrode 62*a* is an electrode common to a plurality of pixels P in the pixel area PA. As shown in FIG. 3, the common electrode 62*a* is not formed in the circumferential area CA, but is formed on the planarizing film 60*a* in the display area TA of the pixel area PA. The common electrode 62*a* is a so-called transparent electrode and, for example, is made of an ITO. In this case, the common electrode 62*a* faces the pixel electrode 62*b* through the insulating film 60*b*. In Embodiment 1, the common electrode 62*a* is formed neither of the sensor area SA of the pixel area PA and the circumferential area CA, but is formed in the display area TA, in which the image display is carried out, in the pixel area PA.

The pixel electrode 62*b* is an electrode electrically connected to the pixel switching element 31. A plurality of pixel electrodes 62*b* are provided in the pixel area PA so as to correspond to a plurality of pixels P, respectively. In this case, the pixel electrode 62*b*, as shown in FIG. 3, is not formed in the circumferential area CA, but is provided on the insulating film 60*b* formed so as to cover the common electrode 62*a* in the display area TA of the pixel area PA. The pixel electrode 62*b* is a so-called transparent electrode and, for example, is made of the ITO. The pixel electrode 62*b* is electrically connected to the drain electrode 54 of the pixel switching element 31. Also, the pixel electrode 62*b* causes the transverse electric field to be generated between the common electrode 62*a* and the pixel electrode 62*b* based on a potential supplied as a video signal from the pixel switching element 31, thereby applying a voltage to the liquid crystal layer 203.

FIG. 6 is a top plan view showing the pixel electrode 62*b* in the liquid crystal display device 100 according to Embodiment 1 of the present invention.

In Embodiment 1, since the liquid crystal panel 200 utilizes the FFS system, as shown in FIG. 6, the pixel electrode 62*b* is formed to have a pectinated shape on an xy-plane facing the counter substrate 202 in the TFT array substrate 201.

Specifically, as shown in FIG. 6, the pixel electrode 62*b* has a backbone portion 62*bk*, and a plurality of branch portions 62*be*.

The backbone portion 62*bk*, as shown in FIG. 6, extends in the x-direction. Also, for example, a contact (not shown) is provided at a central portion of the backbone portion 62*bk*. The pixel electrode 62*b* is electrically connected to the drain electrode of the pixel switching element 31 through the contact.

Each of the branch portions 62*be*, as shown in FIG. 6, extends in the y-direction. A plurality of branch portions 62*be* are disposed at intervals in the x-direction, and one end portions thereof are each connected to the backbone portion 62*bk*. Also, a plurality of branch portions 62*be* extend in parallel with one another in the y-direction.

(Structure of Backlight)

Figure 7:
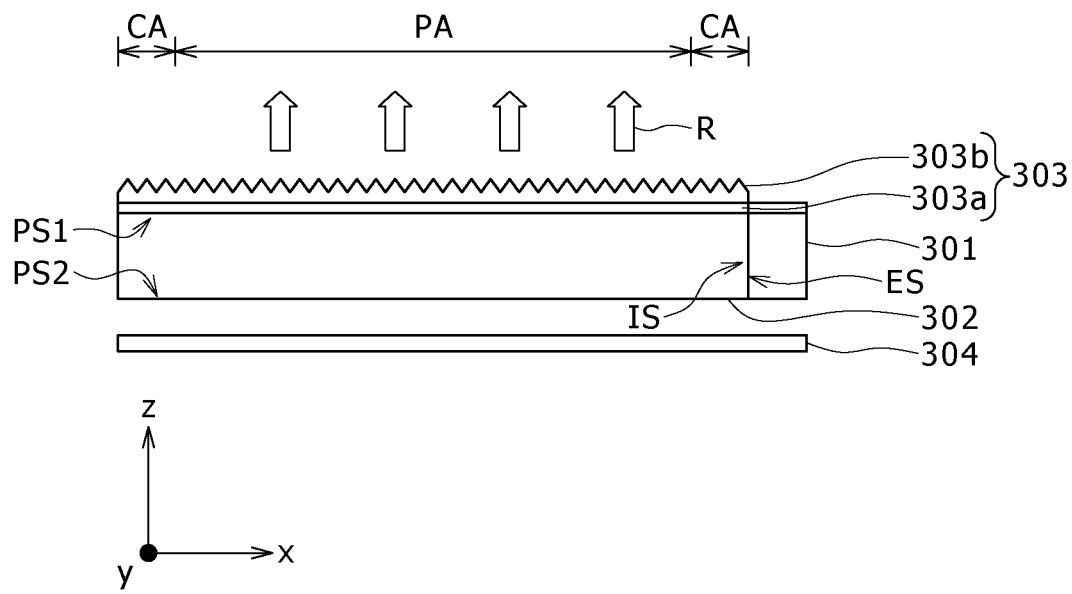
FIG. 7 is a cross sectional view schematically showing a backlight in the liquid crystal display device according to Embodiment 1 of the present invention.

FIG. 7 is a cross sectional view schematically showing the backlight 300 in the liquid crystal display device 100 according to Embodiment 1 of the present invention. FIG. 8 is a perspective view schematically showing a main portion of the backlight 300 in the liquid crystal display device 100 according to Embodiment 1 of the present invention.

As shown in FIG. 7, the backlight 300 includes a light source 301 and a light guide plate 302. The backlight 300 radiates radiation lights R so as to illuminate the entire surface of the pixel area PA of the liquid crystal panel 200.

The light source 301, as shown in FIG. 7, includes an emission surface ES through which the lights are radiated. The emission surface ES is disposed so as to face an incidence surface IS to which the lights are made incident in the light guide plate 302. In this case, the emission surface ES of the light source 301 faces the incidence surface IS provided on a side surface of the light guide plate 302. Also, the light source 301 carries out the light-emission operation in accordance with a control signal supplied thereto from the control portion 401.

In Embodiment 1, as shown in FIG. 8, the light source 301 includes visible light sources 301a and an infrared light source 301b.

Each of the visible light sources 301a, for example, is a white LED (Light Emitting Diode) and radiates a white visible light. The visible light sources 301a, as shown in FIG. 8, are disposed so that the emission surface ES faces the incidence surface IS of the light guide plate 302. Visible lights are radiated from the emission surface ES to the incidence surface IS of the light guide plate 302. In this case, a plurality of visible light sources 301a are arranged along the incidence surface IS of the light guide plate 302.

The infrared light source 301b, for example, is an infrared LED and radiates an infrared light. The infrared light source 301b, as shown in FIG. 8, is disposed so that the emission surface ES faces the incidence surface IS of the light guide plate 302, and radiates an infrared light from the emission surface ES to the incidence surface IS of the light guide plate 302. For example, the infrared light source 301b radiates the infrared light having a central wavelength of 850 nm. In this case, for example, a single infrared light source 301b is disposed so as to stand in line with the visible light sources 301a on the incidence surface IS of the light guide plate 302 having the visible light sources 301a provided therein. In Embodiment 1, as shown in FIG. 8, the infrared light source 301b is disposed approximately at a central portion in the incidence surface IS of the light guide plate 302 having the visible light sources 301a provided therein.

The light guide plate 302, as shown in FIG. 7, is provided so that the emission surface ES of the light source 301 faces the incidence surface IS, and the light radiated through the emission surface ES is made incident to the incidence surface IS. Also, the light guide plate 302 guides the light made incident to the incidence surface IS. Also, the light guide plate 302 emits the light thus guided in the form of the radiation light R through a radiation surface PS1 provided so as to intersect perpendicularly the incidence surface IS. The light guide plate 302 is disposed so as to face the back surface of the liquid crystal panel 200, and emits the radiation light R from the emission surface PS1 toward the back surface of the liquid crystal panel 200. The light guide plate 302, for example, is made of a transparent material, such as an acrylic resin, having a high optical transparency in an injection molding process.

In Embodiment 1, the visible lights emitted from the visible light sources 301a, respectively, and the infrared light emitted from the infrared light source 301b are both made incident to the incidence surface IS, and the light guide plate 302 guides both the visible lights and the infrared light made incident to the incidence surface IS. Also, the visible lights and infrared light thus guided by the light guide plate 302 are emitted as the radiation lights R through the emission surface PS1. As a result, as described above, an image is displayed in the pixel area PA of the transmission type liquid crystal panel 200.

The light guide plate 302, as shown in FIG. 7, is provided with an optical film 303 and a reflecting film 304.

The optical film 303, as shown in FIG. 7, is provided so as to face the emission surface PS1 of the light guide plate 302. The optical film 303 receives the radiation lights R emitted through the emission surface PS1 of the light guide plate 302, thereby modulating the optical characteristics of the radiation lights R.

In Embodiment 1, the optical film 303 includes a diffusion sheet 303a and a prism sheet 303b which are disposed in this order from the side of the light guide plate 302. Also, the diffusion sheet 303a diffuses the radiation lights R emitted through the emission surface PS of the light guide plate 302, and the prism sheet 303b condenses the radiation lights R thus diffused along a normal direction, i.e., the z-direction to the emission surface PS of the light guide plate 302. As a result, the optical film 303 emits the lights emitted from the light guide plate 302 in the form of the radiation lights R, i.e., flat lights to the back surface of the liquid crystal panel 200.

As shown in FIG. 7, the reflecting film 304 is provided so as to face a surface, of the light guide plate 302, opposite to the emission surface PS1 of the light guide plate 302. The reflecting film 304 receives the lights emitted through a surface PS2, of the light guide plate 302, opposite to the emission surface PS1 to reflect the lights thus received to the emission surface PS1 of the light guide plate 302.

(Operation)

A description will now be given with respect to an operation in detecting a position of the object F to be detected based on the data on the received light obtained from the object F to be detected when the finger of the human body as the object F to be detected contacts or moves on the pixel area PA of the liquid crystal panel 200 in the liquid crystal device 100 described above.

Figure 9A:
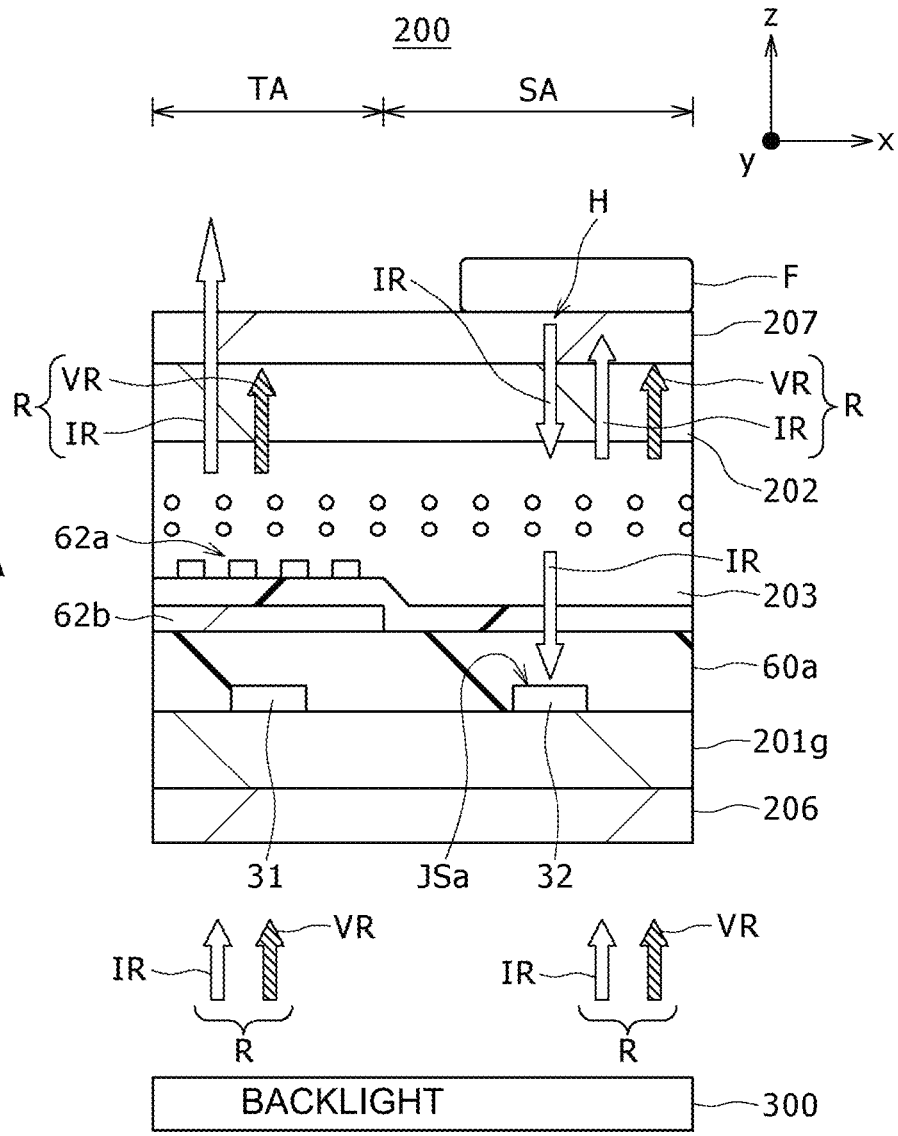
FIGS. 9A and 9B are respectively a cross sectional view and a top plan view schematically showing a situation in detecting a position of a finger of the human body as an object to be detected based on data on received light obtained from the object to be detected when the finger of the human body touches or moves on a pixel area of the liquid crystal panel in the liquid crystal display device according to Embodiment 1 of the present invention.
Figure 9B:
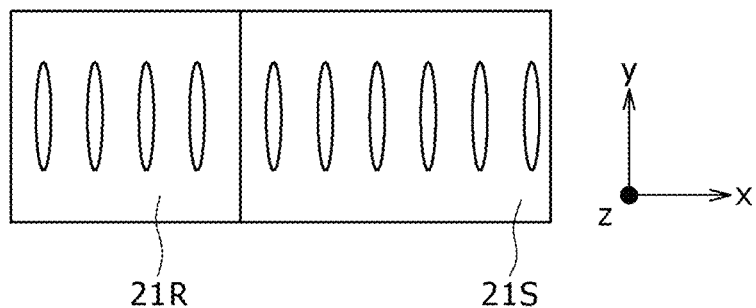
Figure 10A:
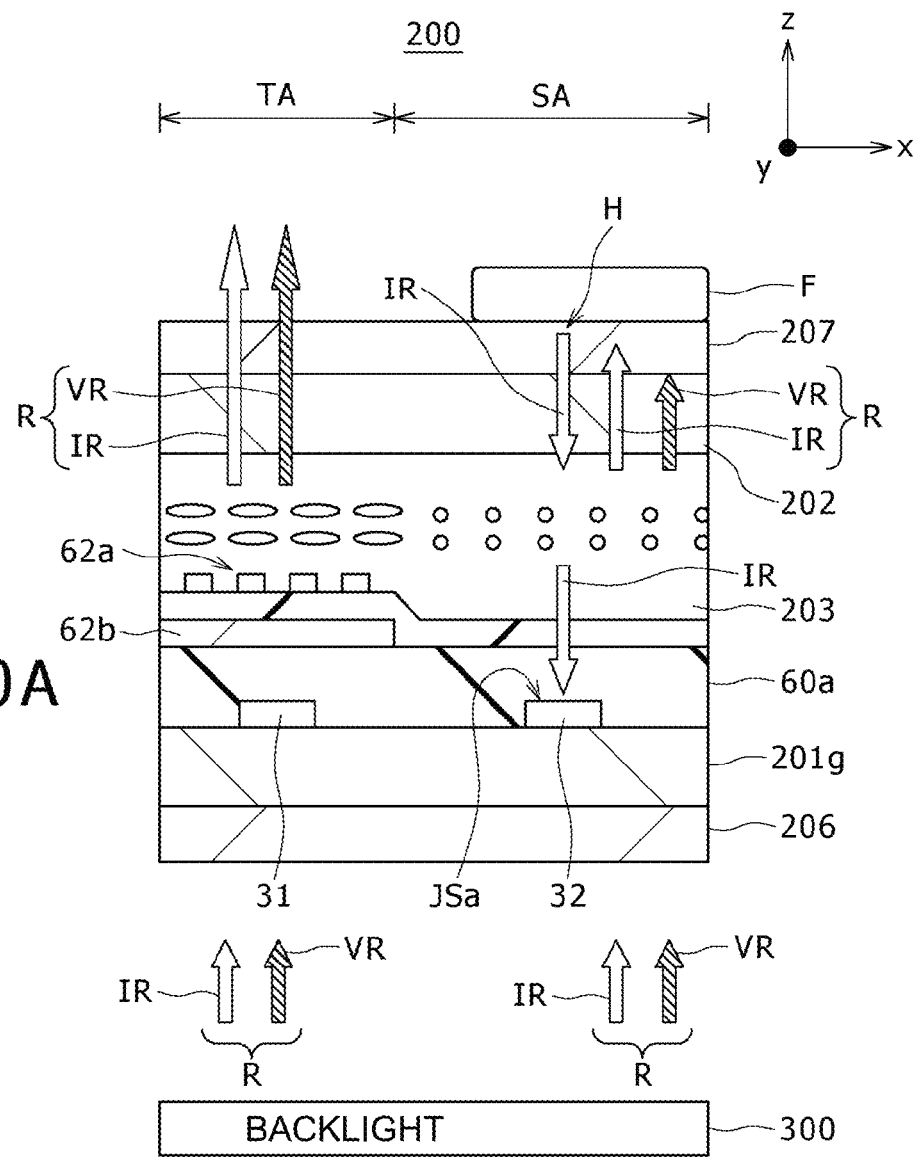
FIGS. 10A and 10B are respectively a cross sectional view and a top plan view schematically showing a situation in detecting a position of the finger of the human body as the object to be detected based on the data on the received light obtained from the object to be detected when the finger of the human body touches or moves on the pixel area of the liquid crystal panel in the liquid crystal display device according to Embodiment of the present invention.
Figure 10B:
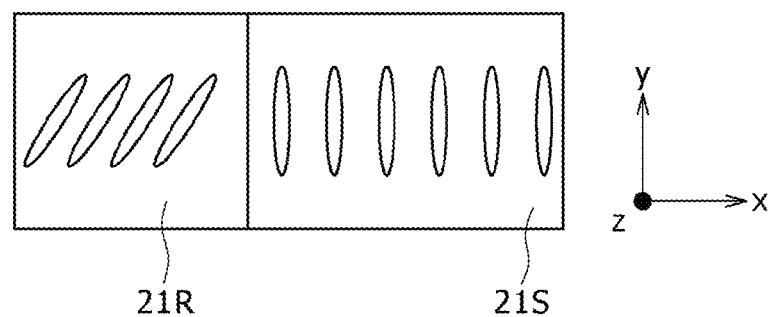

FIGS. 9A and 9B, and FIGS. 10A and 10B are respectively views schematically a situation in detecting a position of the object F to be detected based on the data on the received light obtained from the object F to be detected when the finger of the human body as the object F to be detected contacts or moves on the pixel area PA of the liquid crystal panel 200 in the liquid crystal device 100 according to Embodiment 1 of the present invention. Here, FIGS. 9A and 9B show the case where application of a voltage to the liquid crystal layer 203 is an OFF state. On the other hand, FIGS. 10A and 10B show the case where application of the voltage to the liquid crystal layer 203 is an ON state. In FIGS. 9A and 9B, and FIGS. 10A and 10B, only main portions are illustrated, and none of other portions is illustrated. In addition, FIGS. 9A and 10A are respectively cross sectional views, and FIGS. 9B and 10B are respectively top plan views.

Firstly, a description will be given with respect to the case where application of the voltage to the liquid crystal layer 203 is an OFF state.

In this case, as shown in FIGS. 9A and 9B, in the display area TA of the liquid crystal panel 200, a lengthy direction of the liquid crystal molecules horizontally oriented in the liquid crystal layer 203, for example, extends along with the y-direction. In Embodiment 1, the individual portions are structured so that the display system becomes the normally black system. For this reason, in the display area TA of the liquid crystal panel 200, visible lights VR of the radiation lights R radiated from the backlight 300 are absorbed in the second polarizing plate 207 without being transmitted through the second polarizing plate 207, thereby carrying out the black display.

On the other hand, the infrared light IR of the radiation lights R radiated from the backlight 300 is transmitted through the second polarizing plate 207.

In addition, in the sensor area SA of the liquid crystal panel 200, as shown in FIGS. 9A and 9B, a lengthy direction of the liquid crystal molecules horizontally oriented in the liquid crystal layer 203, for example, extends along the y-direction similarly to the case of the display area TA. For this reason, the visible lights VR of the radiation lights R radiated from the backlight 300 are not also transmitted through the liquid crystal panel 200.

On the other hand, the infrared light IR of the radiation lights R radiated from the backlight 300 is transmitted through the second polarizing plate 207 in the sensor area SA. For this reason, when the object F to be detected such as the finger of the human body touches or moves on the pixel area PA, as shown in FIG. 9A, the infrared light IR transmitted through the second polarizing plate 207 is reflected by the object F to be detected. The members such as the planarizing film 60a composing an optical path of the radiation lights R each have small absorption coefficients for the infrared light IR, and each of the absorption coefficients for the infrared lights IR is approximately zero. As a result, a reflected light H contains therein much infrared light IR. For this reason, the light receiving element 32 provided in the liquid crystal panel 200 receives the reflected light H containing therein much infrared light IR.

In this case, the light receiving element 32 receives the reflected light H directed to the light receiving surface JSa thereof on the light receiving surface JSa thereof, thereby subjecting the reflected light H to the photoelectric conversion. Also, the peripheral circuit reads out the data on the received light originating from the electric charges generated through the photoelectric conversion.

Also, as previously stated, the position detecting portion 402 images an image of the object F to be detected located on the pixel area PA on the front surface side of the liquid crystal panel 200 from the data on the received light thus read out, and detects the position of the object F to be detected from the image thus imaged.

Next, a description will be given with respect to the case where application of the voltage to the liquid crystal layer 203 is in the ON state.

In this case, as shown in FIGS. 10A and 10B, in the display area TA of the liquid crystal panel 200, the lengthy direction of the liquid crystal molecules horizontally oriented in the liquid crystal layer 203 inclines in a direction different from the y-direction. For this reason, in the display area TA of the liquid crystal panel 200, the visible lights VR of the radiation lights R radiated from the backlight 300 are transmitted through the second polarizing plate 207, thereby carrying out the white display. In addition, the infrared light IR of the radiation lights R radiated from the backlight 300 is also transmitted through the second polarizing plate 207.

In addition, no voltage is applied to the liquid crystal layer 203 because neither of the pixel electrode 62b and the common electrode 62a is formed in the sensor area SA of the liquid crystal panel 200. Thus, the lengthy direction of the liquid crystal molecules horizontally oriented in the liquid crystal layer 203, for example, extends along the y-direction similarly to the case where application of the voltage to the liquid crystal layer 203 is in the OFF state. For this reason, the visible lights VR of the radiation lights R radiated from the backlight 300 are not transmitted through the liquid crystal panel 200.

On the other hand, the infrared light IR of the radiation lights R radiated from the backlight 300, as shown in FIGS. 10A and 10B, are transmitted through the second polarizing plate 207 in the sensor area SA similarly to the above case. For this reason, when the object F to be detected such as the finger of the human body touches or moves on the pixel area PA, as shown in FIG. 10A, the infrared light IR transmitted through the second polarizing plate 207 is reflected by the object F to be detected to become the reflected light H. The light receiving element 32 provided in the liquid crystal panel 200 receives the reflected light H. Also, the light receiving element 32 receives the reflected light H directed to the light receiving surface JSa thereof on the light receiving surface JSa thereof, thereby subjecting the reflected light H to the photoelectric conversion. Also, the peripheral circuit reads out the data on the received light originating from the electric charges generated through the photoelectric conversion.

Also, as previously stated, the position detecting portion 402 images an image of the object F to be detected located on the pixel area PA on the front surface side of the liquid crystal panel 200 from the data on the received light read out from the light receiving element 32, and detects the position of the object F to be detected from the image thus imaged.

(Manufacturing Method)

Next, a description will be given with respect to a method of manufacturing the liquid crystal panel 200 in the liquid crystal display device 100 according to Embodiment 1 of the present invention.

FIGS. 11A to 11F are respectively cross sectional views showing main portions of manufacturing processes when the liquid crystal panel 200 in the liquid crystal display device 100 according to Embodiment 1 of the present invention are manufactured in the order of the processes shown in FIG. 11A, FIG. 11B, FIG. 11C, FIG. 11D, FIG. 11E, and FIG. 11F, respectively.

Firstly, as shown in FIG. 11A, the semiconductor elements of the pixel switching element 31, the light receiving element 32, and the peripheral circuit element SK are formed on the surface of the glass substrate 201g.

In this case, as stated above, for example, the TFTs each having the bottom-gate structure having the semiconductor thin film made of polysilicon are formed as the pixel switching element 31 and the peripheral circuit element SK, respectively. Likewise, the photodiode having the PIN structure having the semiconductor thin film made of polysilicon is formed as the light receiving element 32. In Embodiment 1, after a polysilicon film is deposited so as to cover the regions in which the semiconductor elements are intended to be formed, respectively, the polysilicon film is patterned so as to correspond to a pattern shape of the semiconductor layer composing the semiconductor elements, thereby forming the semiconductor elements.

Specifically, the pixel switching element 31 is formed in the display area TA of the pixel area PA. In addition, the light receiving element 32 is formed in the sensor area SA of the pixel area PA. Also, the peripheral circuit element SK composing the peripheral circuit is formed in the circumferential area CA.

Also, as shown in FIG. 11A, the planarizing film 60a is formed on the surface of the glass substrate 201g.

In this case, the planarizing film 60a is formed on the surface of the glass substrate 201g in the pixel area PA and the circumferential area CA so as to cover the pixel switching element 31, the light receiving element 32, and the peripheral circuit element SK, thereby planarizing the surface so that the surface of the planarizing film 60a is disposed along the surface of the glass substrate 201g.

For example, the acrylic system resin is deposited to have a thickness of 1 to 3 μm, thereby forming the planarizing film 60a.

Next, as shown in FIG. 11B, a first transparent conductive film 62 at.

In this case, the first transparent conductive film 62 at is made of the transparent conductive material such as the ITO so as to cover the planarizing film 60a.

Specifically, the first transparent conductive film 62 at is formed on the surface of the planarizing film 60a formed on the surface of the glass substrate 201g so as to cover the display area TA having the pixel switching element 31 formed therein, the sensor area SA having the light receiving element 32 formed therein, and the circumferential area CA having the peripheral circuit SK formed therein.

Next, as shown in FIG. 11C, the common electrode 62a is formed.

In this case, the first transparent conductive film 62 at is patterned, thereby forming the common electrode 62a.

Specifically, the first transparent conductive film 62 at is patterned in a way that the first transparent conductive film 62 at is left in the display area TA having the pixel switching element 31 formed therein, and the first transparent conductive film 62 at is removed in the sensor area SA having the light receiving element 32 formed therein, and in the circumferential area CA having the peripheral circuit element SK formed therein. As a result, the common electrode 62a is formed above the surface of the glass substrate 201g. For example, the first transparent conductive film 62 at is patterned by utilizing the wet etching processing, thereby forming the common electrode 62a.

Next, as shown in FIG. 11D, the insulating film 60b is formed.

In this case, for example, the insulating film 60b is formed from a silicon nitride film so as to cover the common electrode 62a.

Specifically, the insulating film 62b is formed above the surface of the glass substrate 201g so as to cover the display area TA having the pixel switching element 31 formed therein, the sensor area SA having the light receiving element 32 formed therein, and the circumferential area CA having the peripheral circuit SK formed therein.

Next, as shown in FIG. 11E, a second transparent conductive film 62bt is formed.

In this case, the second transparent conductive film 62bt is made of a transparent material such as the ITO so as to cover the insulating film 60b.

Specifically, the second transparent conductive film 62bt is formed above the surface of the glass substrate 200g so as to cover the display area TA having the pixel switching element 31 formed therein, the sensor area SA having the light receiving element 32 formed therein, and the circumferential area CA having the peripheral circuit element SK formed therein.

Next, as shown in FIG. 11F, the pixel electrode 62b is formed.

In this case, the second transparent conductive film 62bt is patterned by utilizing the lithography technique, thereby forming the pixel electrode 62b.

Specifically, the pixel electrode 62b is formed above the surface of the glass substrate 201g so as to correspond to the display area TA having the pixel switching element 31 formed therein. In Embodiment 1, as stated above, the second transparent conductive film 62bt is patterned by utilizing the wet etching processing so as to have the pectinated planar structure, thereby forming the pixel electrode 62b.

Also, the TFT array substrate 201 having the portions formed therein in the manner described above is stuck to the counter substrate 202 specially formed. In this case, before the TFT array substrate 201 is stuck to the counter substrate 202, after an oriented film, for example, made of polyimide is formed on each of the surfaces of the TFT array substrate 201 and the counter substrate 202 facing each other, the oriented film is subjected to the rubbing processing. Also, the TFT array substrate 201 and the counter substrate 202 are stuck to each other to face each other so as to leave a space between them.

After that, the liquid crystal is injected into the space defined between the TFT array substrate 201 and the counter substrate 202, and the liquid crystal panel is oriented, thereby forming the liquid crystal panel 200. Also, the first and second polarizing plates 206 and 207, and the peripheral devices such as the backlight 300 are mounted to the liquid crystal panel 200, thereby completing the liquid crystal display device 100.

As described above, in Embodiment 1, the insulating film 60b is formed on the surface of the planarizing film 60a in the sensor area SA having the light receiving element 32 provided therein in the pixel area PA. However, the dry etching processing for removing the insulating film 60b formed on the surface of the planarizing film 60a in the sensor area SA is not carried out.

For this reason, when the insulating film 60b is removed by carrying out the dry etching processing, as stated above, the light receiving element 32 may be damaged by the plasma in the dry etching processing. As a result, there may be caused a problem that the optical sensitivity of the light receiving element 32 is deteriorated, and thus the dark current is increased. In Embodiment 1, however, this problem can be prevented from being caused because the dry etching processing is not carried out for the insulating film 60b.

Figure 12:
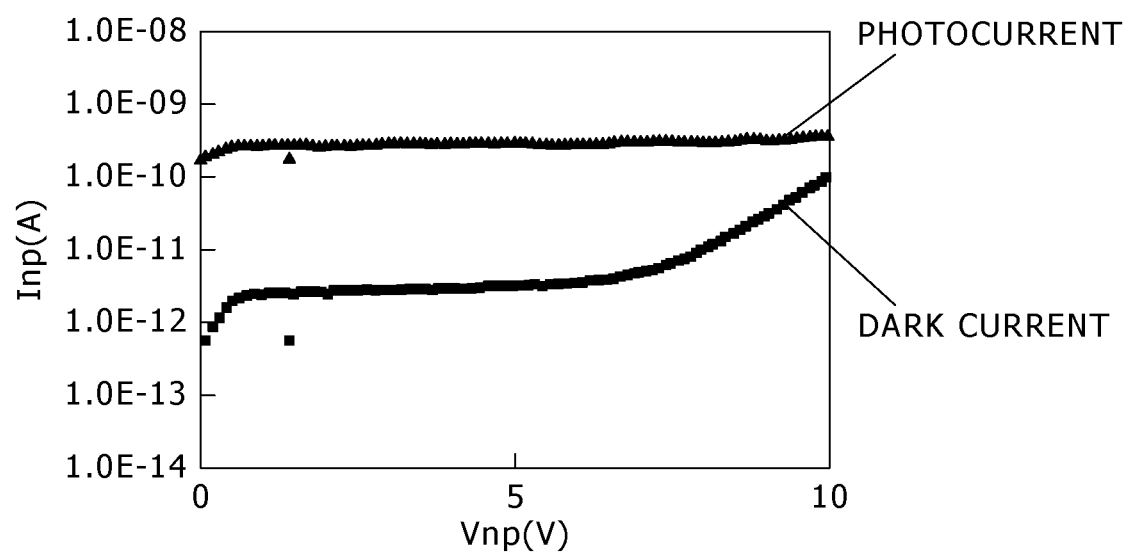
FIG. 12 is a graph showing photocurrent vs. bias voltage characteristics of the light receiving element in the liquid crystal display device according to Embodiment of the present invention.
Figure 13:
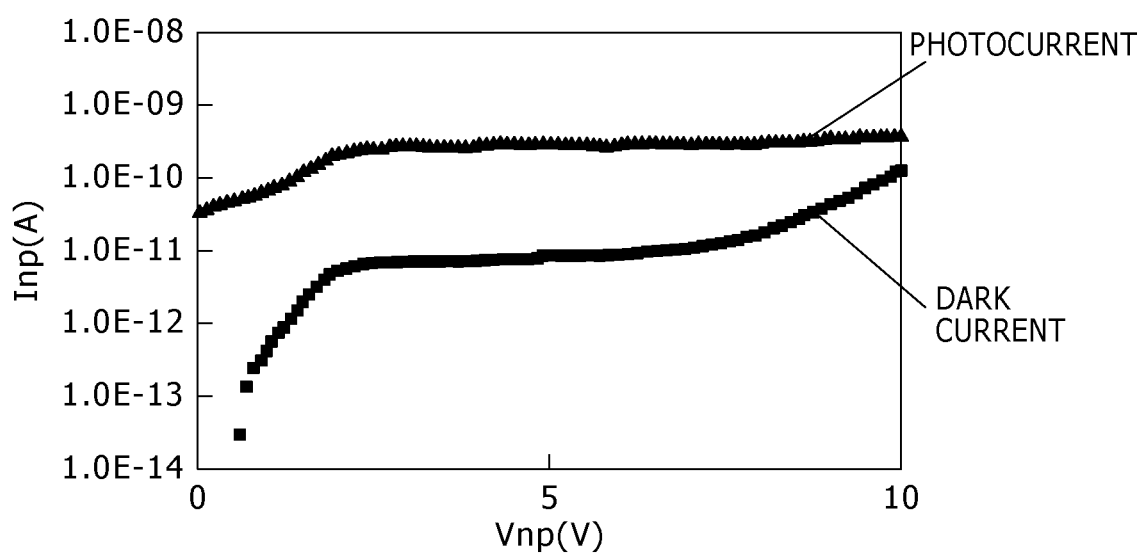
FIG. 13 is a graph showing photocurrent vs. bias voltage characteristics of a light receiving element in the case where an insulating film formed on a surface of a planarizing film is removed by carrying out dry etching processing as shown in FIGS. 27A to 27D unlike Embodiment of the present invention.

FIG. 12 is a graph showing photocurrent vs. bias voltage characteristics of the light receiving element 32 in Embodiment 1 of the present invention. On the other hand, FIG. 13 is a graph showing photocurrent vs. bias voltage characteristics of the light receiving element 32 in the case where the insulating film 60b formed on the surface of the planarizing film 60a is removed by carrying out the dry etching processing as shown in FIGS. 27A to 27D unlike Embodiment 1 of the present invention. In FIGS. 12 and 13, an axis of abscissa represents the bias current Vnp(V), and an axis of ordinate represents the current Inp(A). Also, the photocurrent and the dark current are each plotted as the current Inp(A). In this case, the photocurrent vs. bias voltage characteristics were measured under the conditions that under the radiation of a given quantity of light, the potential applied to the n layer 47n of the light receiving element 32, and the potential applied to the gate electrode 43 of the light receiving element 32 are made identical to each other, and the reverse bias voltage applied across the n layer 47n and the p layer 47p is changed.

As shown in FIGS. 12 and 13, comparing the case where the insulating film 60b is not removed because no dry etching processing is carried out, and the case where the insulating film 60b is removed by carrying out the dry etching processing with each other, it is understood that the photocurrent obtained in the low bias voltage is different between these cases. In the case where the insulating film 60b is not removed because no the dry etching processing is carried out as in the case of Embodiment 1, the photocurrent having a high current value is obtained even in the low bias voltage unlike the case where the insulating film 60b is removed by carrying out the dry etching processing. Also, in the case where the insulating film 60b is not removed because no the dry etching processing is carried out as in the case of Embodiment 1, no defective level occurs in PIN junction portions because the light receiving element 32 is not damaged by the plasma in the dry etching processing. As a result, in Embodiment 1, the satisfactory measurement results as described above can be obtained because no electron-hole pair is trapped in any of the defective levels in a phase of the radiation of the light.

In addition, as shown in FIGS. 12 and 13, in the case where the insulating film 60b is not removed because no the dry etching processing is carried out as in the case of Embodiment 1, the dark current is small unlike the case where the insulating film 60b is removed by carrying out the dry etching processing. As described above, in the case where the insulating film 60b is not removed because no the dry etching processing is carried out as in the case of Embodiment 1, no defective level occurs in the PIN junction portions because the light receiving element 32 is not damaged by the plasma in the dry etching processing. As a result, the satisfactory measurement results as described above can be obtained because a leakage current is prevented from increasing through the defective levels in the phase of application of the reverse bias.

Therefore, according to Embodiment 1 of the present invention, the optical sensitivity of the light receiving element 32 is enhanced, and thus it is possible to suppress occurrence of the dark current.

In addition, in Embodiment 1, it is possible to obtain a high capability of blocking penetration of the moisture from the external environment because the insulating film 60b made of the inorganic material is laminated on the planarizing film 60a made of the organic material. As a result, it is possible to enhance the moisture resistance. The penetration of the moisture into the light receiving element 32 causes the dark current to increase in some cases. In Embodiment 1, however, it is possible to realize the satisfactory light receiving element characteristics because the effect of enhancing the moisture resistance is obtained as described above.

In addition, in Embodiment 1, the transparent conductive film such as the common electrode is not formed on the planarizing film 60a in the circumferential area CA having the peripheral circuit formed therein. When the transparent conductive film exists on the peripheral circuit, a parasitic capacitance of the circuit increases, thereby increasing the load. As a result, the power consumption increases. However, it is possible to prevent this problem from being caused because the transparent conductive film such as the common electrode is not formed on the planarizing film 60a.

In addition, in Embodiment 1, the backlight 300 radiates the radiation lights R so as for the radiation lights R to contain the infrared light IR in addition to the visible lights VR. For this reason, even when the image is displayed either under the dark environment or with a low luminance, the light H obtained by reflecting the infrared light IR from the finger of the user or the tip of the stylus is detected, which results in that the information on the position of the finger of the user or the tip of the stylus can be detected with a high S/N ratio. Therefore, a probability of false detection is low even when the picture, such as a night view, having the low luminance is the background. As a result, it is possible to increase the degree of freedom of the design of a graphical user interface, and it is also possible to realize the reliable display device having the touch panel built therein.

Embodiment 2

Hereinafter, Embodiment 2 of the present invention will be described in detail.

Figure 14:
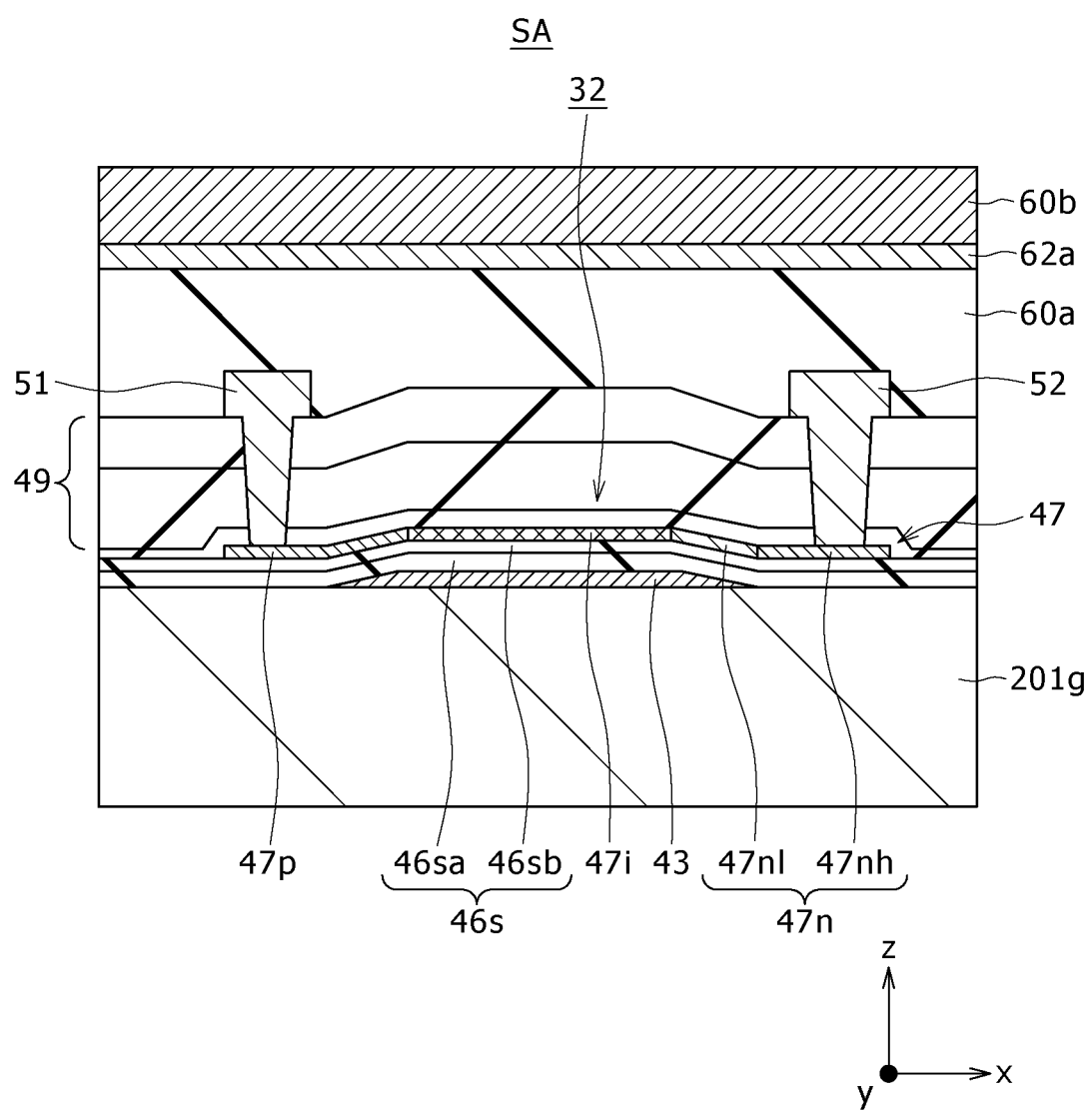
FIG. 14 is a cross sectional view showing a sensor area having a light receiving element provided therein in a pixel area in a liquid crystal display device according to Embodiment 2 of the present invention.

FIG. 14 is a cross sectional view showing the sensor area SA having the light receiving element 32 provided therein in the pixel area PA in a liquid crystal display device 100 according to Embodiment 2 of the present invention.

Embodiment 2 is similar to Embodiment 1 except that the common electrode 62a is formed in the sensor area SA as shown in FIG. 14. For this reason, a description of any of repeated portions is omitted here for the sake of simplicity.

In Embodiment 2, the common electrode 62a is formed in the sensor area SA as well in addition to the display area TA of the pixel area PA as shown in FIG. 14. In this case, the common electrode 62a is formed so as to be interposed between the insulating film 60b and the planarizing film 60a in the sensor area SA as well similarly to the case of the display area TA.

As has been described, in Embodiment 2, unlike Embodiment 1, the common electrode 62a is formed in the sensor area SA as well. In Embodiment 2, however, the insulating film 60b is formed on the surface of the planarizing film 60a in the sensor area SA having the light receiving element 32 provided therein in the pixel area PA similarly to the case of Embodiment 1. However, the dry etching processing for removing the insulating film 60b formed on the surface of the planarizing film 60a in the sensor area SA is not carried out, and thus the insulating film 60b is left on the surface of the planarizing film 60a.

Therefore, according to Embodiment 2 of the present invention, the optical sensitivity of the light receiving element 32 is enhanced, and thus it is possible to suppress occurrence of the dark current similarly to the case of Embodiment 1.

In particular, when the common electrode 62a is formed through the pattern processing by carrying out the dry etching processing, the same problem as that in the above case may be caused. However, Embodiment 2 is preferable because the common electrode 62a is left in the sensor area SA, and thus the light receiving element 32 is free from the damage caused by the dry etching processing.

In addition, in Embodiment 2, the common electrode 62a is left in the sensor area SA and serves as an electric field shielding member. Thus, the common electrode 62a can shield an unintentional electric field which may be applied from the wiring or the like existing in the upper portion overlying the sensor area SA to the common electrode 62a. As a result, it is possible to prevent a bad influence from being exerted on the sensor performance. In addition, when the common electrode 62a is separated into parts corresponding to the sensors, respectively, the electric field is intentionally applied, thereby modulating a depletion layer of the i layer 47i as the photoelectric conversion layer. As a result, it is also possible to increase the optical sensitivity of the light receiving element 32.

Embodiment 3

Hereinafter, Embodiment 3 of the present invention will be described in detail.

Figure 15:
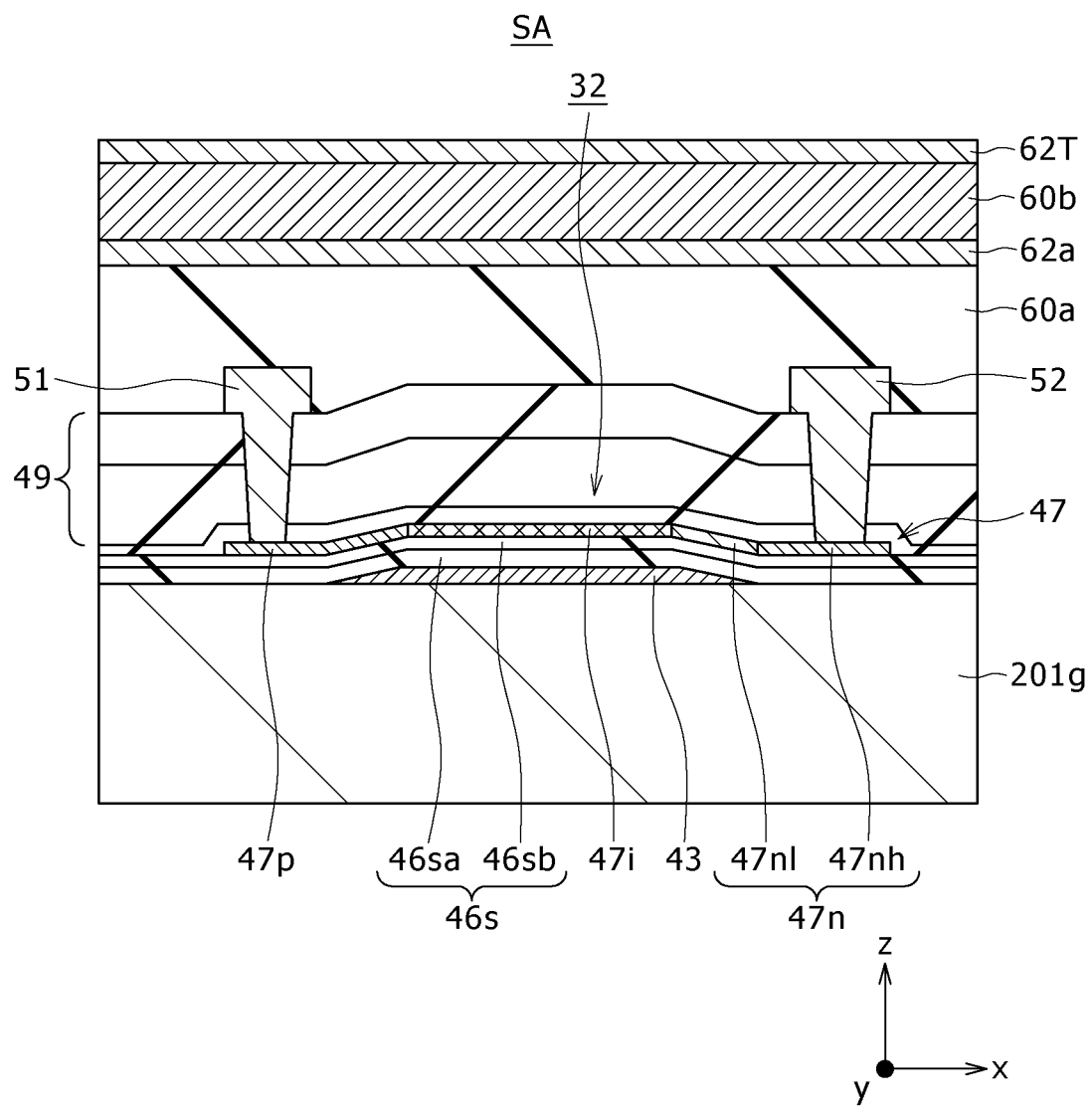
FIG. 15 is a cross sectional view showing a sensor area having a light receiving element provided therein in a pixel area in a liquid crystal display device according to Embodiment 3 of the present invention.

FIG. 15 is a cross sectional view showing the sensor area SA having the light receiving element 32 provided therein in the pixel area PA in a liquid crystal display device 100 according to Embodiment 3 of the present invention.

Embodiment 3 is similar to Embodiment 2 except that a transparent conductive layer 62T is provided in the sensor area SA. For this reason, a description of any of repeated portions is omitted here for the sake of simplicity.

In Embodiment 3, as shown in FIG. 15, the transparent conductive layer 62T is formed on the insulating film 60b which is formed so as to cover the common electrode 62a in the sensor area SA of the pixel area PA. The transparent conductive layer 62T, for example, is made of the ITO similarly to the case of the pixel electrode 62b.

Specifically, when the pixel electrode 62b is formed from the second transparent conductive film 62bt formed as shown in FIG. 11E in Embodiment 1, the second transparent conductive film 62bt is patterned so that a portion of the second transparent conductive film 62bt provided in the sensor area SA is left, thereby forming the transparent conductive layer 62T.

As has been described, in Embodiment 3, unlike Embodiment 2, the transparent conductive layer 62T is provided in the sensor area SA. In Embodiment 3, however, similarly to the cases of Embodiment 1 and Embodiment 2, although the insulating film 60b is formed on the surface of the planarizing film 60a in the sensor area SA having the light receiving element 32 provided therein in the pixel area PA, the dry etching processing for removing the insulating film 60b formed on the surface of the planarizing film 60a in the sensor area SA is not carried out, and thus the insulating film 60b is left on the planarizing film 60a.

Therefore, according to Embodiment 3 of the present invention, the optical sensitivity of the light receiving element 32 is enhanced, and thus it is possible to suppress occurrence of the dark current similarly to the cases of Embodiment 1 and Embodiment 2.

In particular, when the pixel electrode 62b is formed through the pattern processing by carrying out the dry etching processing, the same problem as that in the above case may be caused. However, Embodiment 3 is preferable because the transparent conductive layer 62T is left in the sensor area SA, and thus the light receiving element 32 is free from the damage caused by the dry etching processing.

In Embodiment 3, an electrostatic capacitance is formed between the common electrode 62a and the transparent conductive layer 62T because the transparent conductive layer 62T is further formed on the common electrode 62a through the insulating film 60b. Therefore, an effect that the transparent conductive layer 62T can also be used as a part of a circuit element such as a storage capacitor of the sensor or an additional capacitor of the pixel electrode is offered in addition to the effect described in Embodiment 2.

Embodiment 4

Hereinafter, Embodiment 4 of the present invention will be described in detail.

Figure 16:
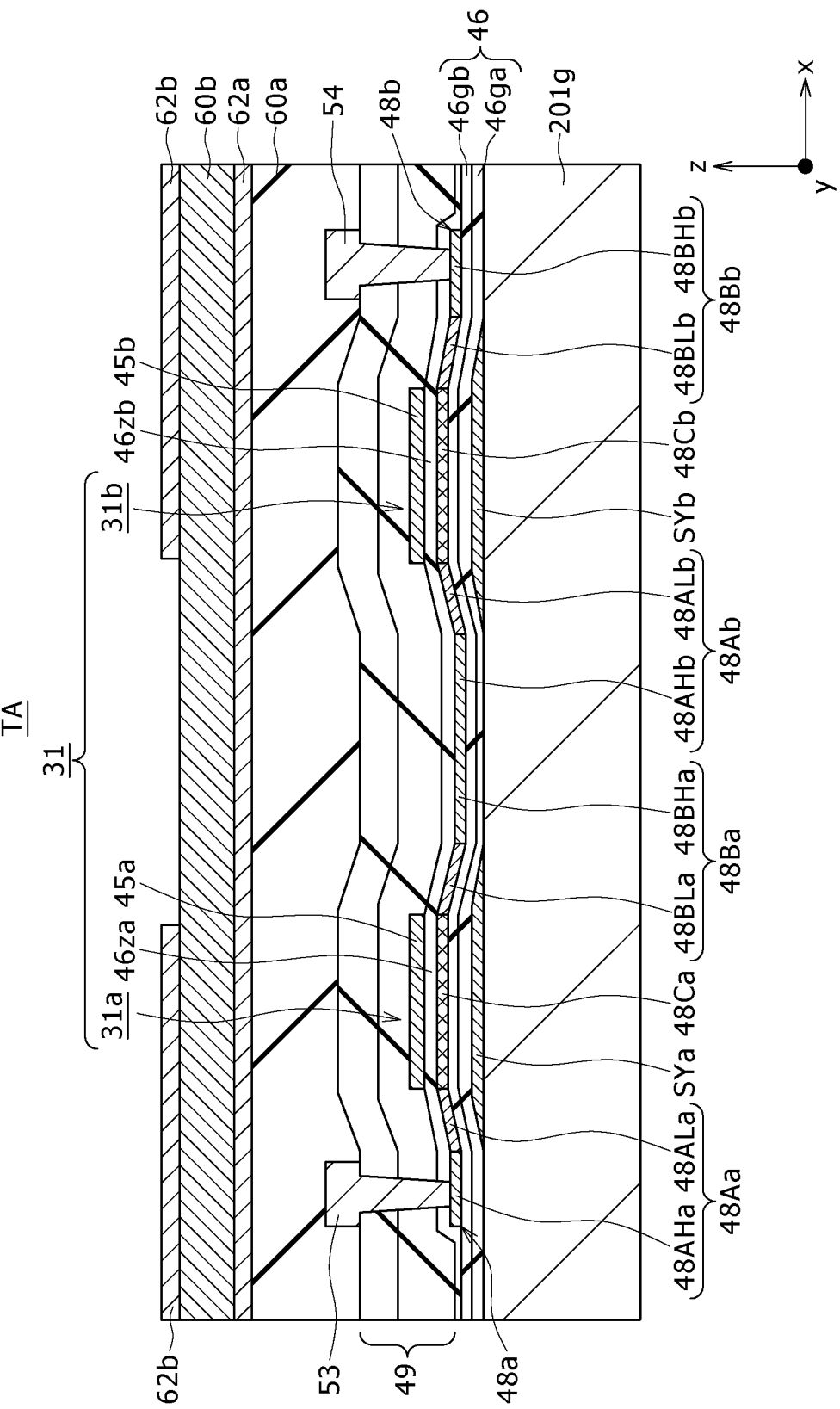
FIG. 16 is a cross sectional view showing a display area having an optical switching element provided therein in a pixel area in a liquid crystal display device according to Embodiment 4 of the present invention.
Figure 17:
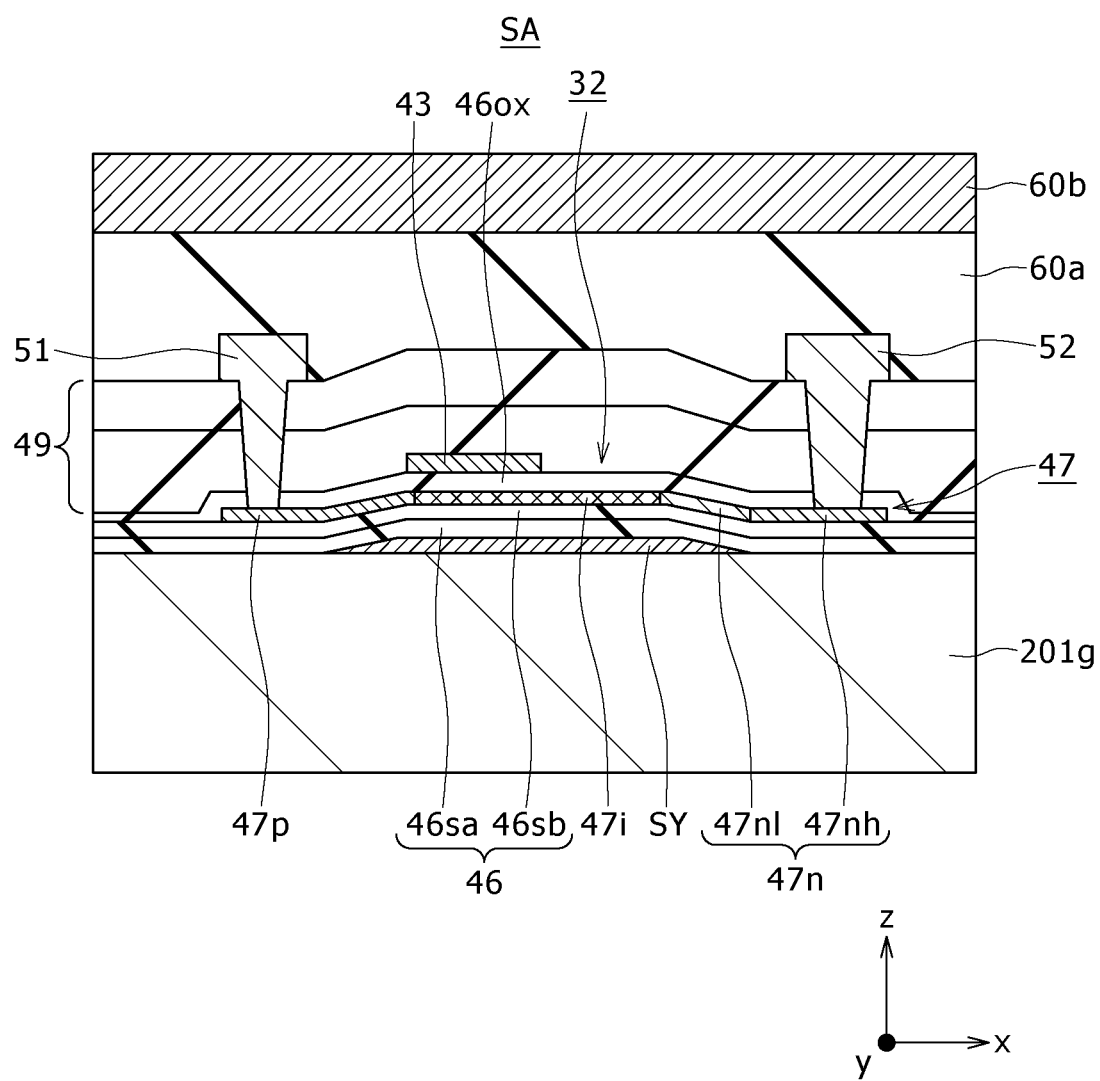
FIG. 17 is a cross sectional view showing a sensor area having a light receiving element provided therein in the pixel area in the liquid crystal display device according to Embodiment 4 of the present invention.
Figure 18:
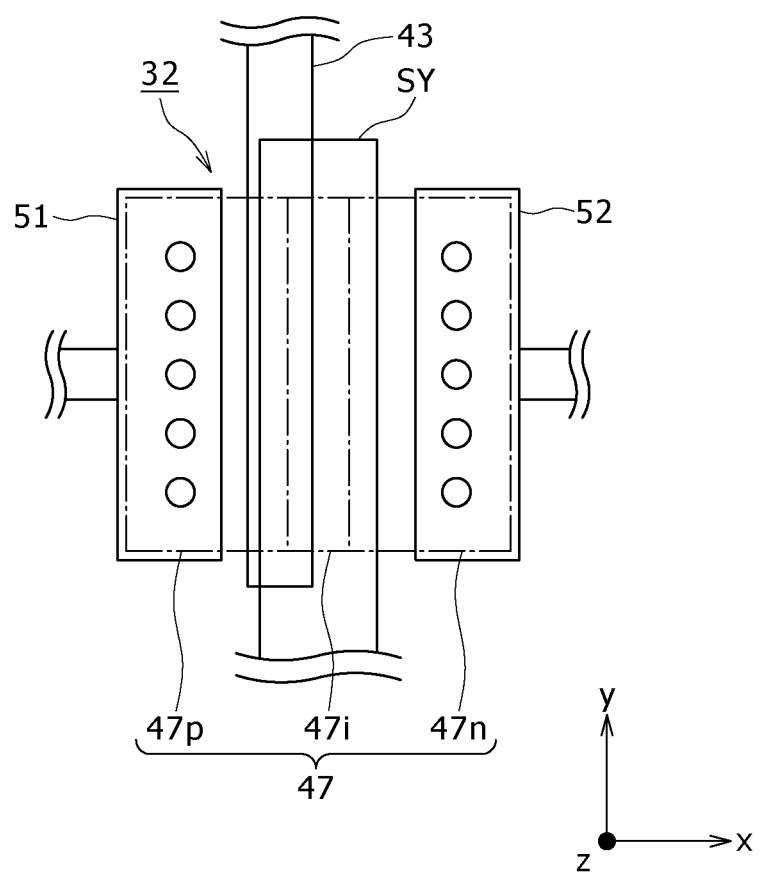
FIG. 18 is a top plan view showing the light receiving element in the liquid crystal display device according to Embodiment 4 of the present invention.

FIG. 16 is a cross sectional view showing the display area TA having the pixel switching element 31 provided therein in the pixel area PA in a liquid crystal display device 100 according to Embodiment 4 of the present invention. FIG. 17 is a cross sectional view showing the sensor area SA having the light receiving element 32 provided therein in the pixel area PA in the liquid crystal display device 100 according to Embodiment 4 of the present invention. FIG. 18 is a top plan view showing the light receiving element 32 in the liquid crystal display device 100 according to Embodiment 4 of the present invention. Also, FIG. 19 is a cross sectional view showing the circumferential area CA having the peripheral circuit element SK provided therein in the liquid crystal display device 100 according to Embodiment 4 of the present invention.

Figure 19:
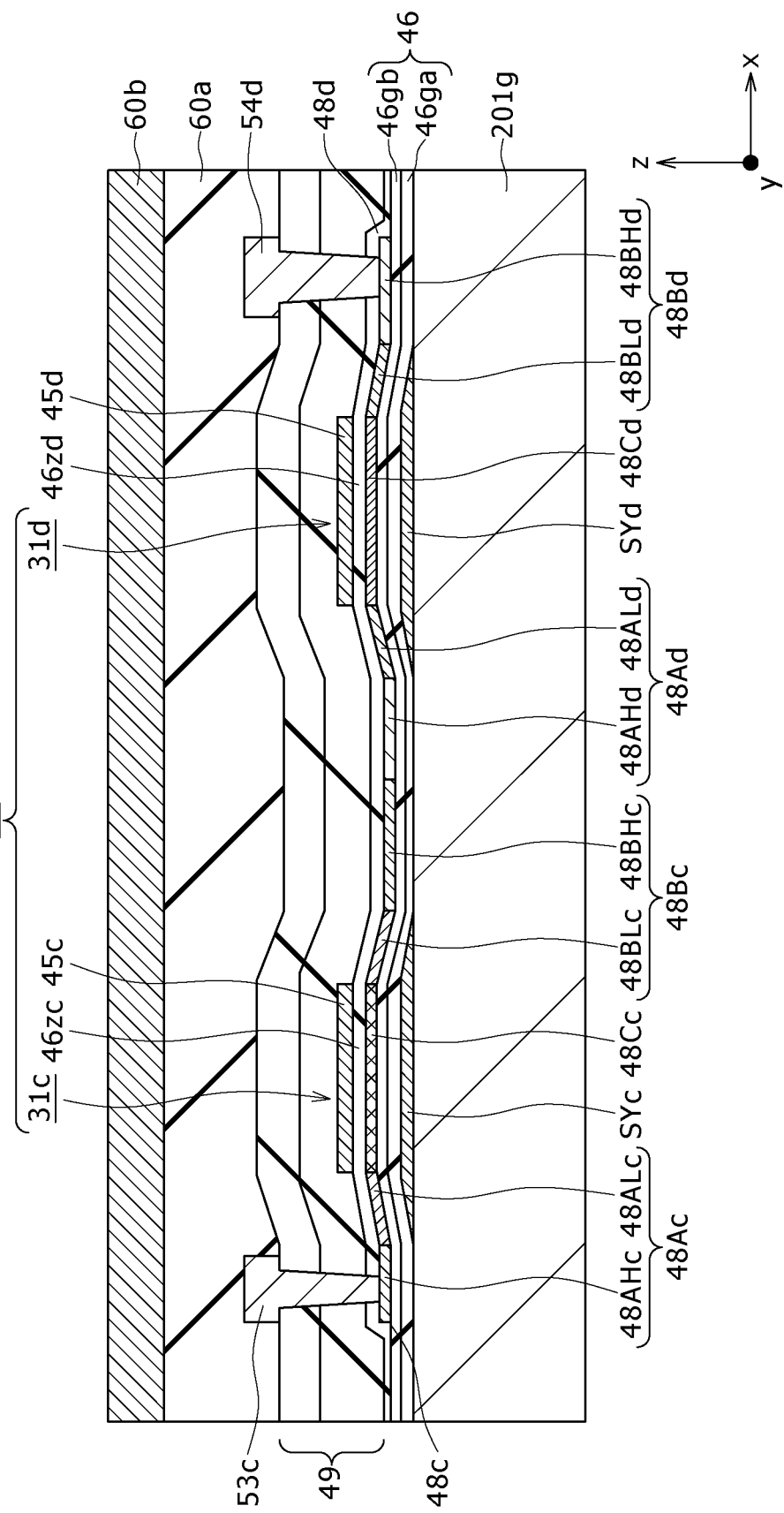
FIG. 19 is a cross sectional view showing a circumferential area having a peripheral circuit element provided therein in the liquid crystal display device according to Embodiment 4 of the present invention.

Embodiment 4 is similar to Embodiment 1 except that the pixel switching element 31, as shown in FIG. 16, is different in structure from that in Embodiment 1, the light receiving element 32, as shown in FIGS. 17 and 18, is different in structure from that in Embodiment 1, and the peripheral circuit element SK, as shown in FIG. 19, is different in structure from that in Embodiment 1. For this reason, a description of any of repeated portions is omitted here for the sake of simplicity.

The pixel switching element 31, unlike Embodiment 1, is a double-gate TFT, and, as shown in FIG. 16, includes a first TFT 31a and a second TFT 31b.

The first TFT 31a composing the pixel switching element 31, as shown in FIG. 16, has a top-gate structure, and includes a light shielding layer SYa, a gate electrode 45a, a gate insulating film 46za, and a semiconductor layer 48a.

In the TFT 31a, the light shielding layer SYa, for example, is made of a metallic material such as molybdenum on the glass substrate 201g. The light shielding layer SYa light-shields a light made incident thereto from the back surface side of the liquid crystal panel 200. In this case, as shown in FIG. 16, the gate electrode SYa is provided on the surface of the glass substrate 201g so as to face a channel region 48Ca of the semiconductor layer 48a through the insulating film 46.

In addition, in the first TFT 31a, the gate electrode 45a, for example, is made of a metallic material such as aluminum. In this case, as shown in FIG. 16, the gate electrode 45a is formed above the surface of the glass substrate 201g so as to face the channel region 48Ca of the semiconductor layer 48a through the gate insulating film 46za.

In addition, in the first TFT 31a, as shown in FIG. 16, the gate insulating film 46za, for example, is made from a silicon oxide film, and is formed so as to be interposed between the channel region 48Ca of the semiconductor layer 48a and the gate electrode 45a.

In addition, in the first TFT 31a, the semiconductor layer 48a, for example, is made of polysilicon. In the semiconductor layer 48a, as shown in FIG. 16, the channel region 48Ca is formed so as to correspond to the gate electrode 45a. In this case, the channel region 48Ca is formed so as to face the light shielding layer SYa through the insulating film 46 obtained by laminating a silicon oxide film 46gb on a silicon nitride film 46ga. Also, in the semiconductor layer 48a, a pair of source/drain regions 48Aa and 48Ba is formed so as to sandwich the channel region 48Ca between the source/drain regions 48Aa and 48Ba. In the pair of source/drain regions 48Aa and 48Ba, a pair of low impurity concentrated regions 48ALa and 48BLa are formed so as to sandwich the channel region 48Ca between the low impurity concentrated regions 48ALa and 48BLa. Moreover, a pair of high impurity concentrated regions 48AHa and 48BHa having higher impurity concentrations than those of the low impurity concentrated regions 48ALa and 48BLa are formed so as to sandwich the pair of low impurity concentrated regions 48ALa and 48BLa between the high impurity concentrated regions 48AHa and 48BHa.

Also, the second TFT 31b composing the pixel switching element 31, as shown in FIG. 16, has the top-gate structure similarly to the case of the first TFT 31a. The second TFT 31b includes a light shielding layer SYb, a gate electrode 45b, a gate insulating film 46za, and a semiconductor layer 48b.

In the second TFT 31b, the light shielding layer SYb, for example, is made of a metallic material such as molybdenum on the glass substrate 201g similarly to the case of the light shielding layer SYa of the first TFT 31a. The light shielding layer SYb light-shields a light made incident thereto from the back surface side of the liquid crystal panel 200. In this case, as shown in FIG. 16, the gate electrode SYb is provided on the surface of the glass substrate 201g so as to face a channel region 48Cb of the semiconductor layer 48b through the insulating film 46.

In addition, in the second TFT 31b, the gate electrode 45b, for example, is made of a metallic material such as aluminum similarly to the case of the gate electrode 45a of the first TFT 31a. In this case, as shown in FIG. 16, the gate electrode 45b is formed above the surface of the glass substrate 201g so as to face the channel region 48Cb of the semiconductor layer 48b through the gate insulating film 46zb.

In addition, in the second TFT 31b, as shown in FIG. 16, the gate insulating film 46zb, for example, is made from a silicon oxide film and is formed so as to be interposed between the channel region 48Cb of the semiconductor layer 48b and the gate electrode 45b similarly to the case of the gate insulating film 46za of the first TFT 31a.

In addition, in the second TFT 31b, the semiconductor layer 48b, for example, is made of polysilicon similarly to the case of the semiconductor layer 48a of the first TFT 31a. In the semiconductor layer 48b, as shown in FIG. 16, the channel region 48Cb is formed so as to correspond to the gate electrode 45b. In this case, the channel region 48Cb is formed so as to face the light shielding layer SYb through the insulating film 46 obtained by laminating the silicon oxide film 46gb on the silicon nitride film 46ga. Also, in the semiconductor layer 48b, a pair of source/drain regions 48Ab and 48Bb is formed so as to sandwich the channel region 48Cb between the source/drain regions 48Ab and 48Bb. In the pair of source/drain regions 48Ab and 48Bb, a pair of low impurity concentrated regions 48ALb and 48BLb is formed so as to sandwich the channel region 48Cb between the low impurity concentrated regions 48ALb and 48BLb. Moreover, a pair of high impurity concentrated regions 48AHb and 48BHb having higher impurity concentrations than those of the low impurity concentrated regions 48ALb and 48BLb are formed so as to sandwich the pair of low impurity concentrated regions 48ALb and 48BLb between the high impurity concentrated regions 48AHb and 48BHb.

In the pixel switching element 31, as shown in FIG. 16, the semiconductor layer 48a of the first TFT 31a, and the semiconductor layer 48b of the first TFT 31b are formed integrally with each other. Also, the source/drain region 48Ba of the first TFT 31a, and the source/drain region 48Ab of the first TFT 31b are formed adjacent to each other to be electrically connected to each other.

Also, in the pixel switching element 31, the source electrode 53 is provided so as to be electrically connected to the source/drain region 48Aa different from the source/drain region 48Ba connected to the second TFT 31b in the first TFT 31a. In addition, the drain electrode 54 is provided so as to be electrically connected to the source/drain region 48Bb different from the source/drain region 48Ab connected to the first TFT 31a in the second TFT 31b. In this case, each of the source region 53 and the drain electrode 54 is made of the conductive material such as aluminum similarly to the case of Embodiment 1.

As shown in FIGS. 17 and 18, the light receiving element 32 includes a light shielding layer SY, a gate electrode 43, a gate insulating film 46ox, and a semiconductor layer 47, and has the top-gate structure unlike the case of Embodiment 1.

In the light receiving element 32, the light shielding layer SY, for example, is made of a metallic material such as molybdenum on the glass substrate 201g. The light shielding layer SY light-shields a light made incident thereto from the back surface side of the liquid crystal panel 200. In this case, as shown in FIG. 17, the light shielding layer SY is provided on the surface of the glass substrate 201g so as to face an i layer 47i of the semiconductor layer 47 through the insulating film 46.

In the light receiving element 32, the gate electrode 43, for example, is made of the metallic material such as aluminum. In this case, as shown in FIG. 17, the gate electrode 43 is provided so as to face the i layer 47i of the semiconductor layer 47 through the gate insulating film 46ox on the side opposite to a side, of a surface of the semiconductor layer 47, having the light shielding layer SY formed thereon. In Embodiment 4, the surface of the gate electrode 43 facing the i layer 47i of the semiconductor layer 47 is formed so as to become smaller than that of the i layer 47i of the semiconductor layer 47 so that the light made incident from the front surface side is made incident to the i layer 47i of the semiconductor 47 without being light-shielded. That is to say, the gate electrode 43 is formed so as not to cover the entire surface of the i layer 47i of the semiconductor layer 47, but so as to cover only a part of the surface of the i layer 47i of the semiconductor layer 47.

In addition, in the light receiving element 32, the gate insulating film 46ox, for example, is made from a silicon oxide film and is formed so as to be interposed between the i layer 47i of the semiconductor layer 47, and the gate electrode 43.

In addition, in the light receiving element 32, the semiconductor layer 47, for example, is made of polysilicon similarly to the case of Embodiment 1, and, as shown in FIG. 17, includes a p layer 47p, an n layer 47n, and the i layer 47i. In this case, the semiconductor layer 47 is formed so as for the i layer 47i to face the light shielding layer SY through the insulating film 46 obtained by laminating the silicon oxide film 46sb on the silicon nitride film 46sa.

Also, in the light receiving element 32, each of the anode electrode 51 and the cathode electrode 52 is made of aluminum similarly to the case of Embodiment 1. In this case, as shown in FIG. 17, the interlayer insulating film 49 is provided so as to cover the semiconductor layer 47. The conductive material is filled in the contact hole extending completely through the interlayer insulating film 49, and is then patterned, which results in that the anode electrode 51 is provided so as to be electrically connected to the p layer 47p. Similarly to the case of the anode electrode 51, the conductive material is filled in the contact hole extending completely through the interlayer insulating film 49, and is then patterned, which results in that the cathode electrode 52 is provided so as to be electrically connected to the n layer 47n.

As shown in FIG. 19, the peripheral circuit element SK, for example, includes a third TFT 31c and a fourth TFT 31d.

As shown in FIG. 19, the third TFT 31c composing the peripheral circuit element SK has the top-gate structure. Also, the third TFT 31c includes a light shielding layer SYc, a gate electrode 45c, a gate insulating film 46zc, and a semiconductor layer 48c, and is formed as an N-channel TFT.

In the third TFT 31c, the light shielding layer SYc, for example, is made of the metallic material such as molybdenum on the glass substrate 201g. The light shielding layer SYc light-shields a light made incident thereto from the back surface side of the liquid crystal panel 200. In this case, as shown in FIG. 19, the light shielding layer SYc is provided on the surface of the glass substrate 201g so as to face a channel region 48Cc of a semiconductor layer 48c through the insulating film 46.

In addition, in the third TFT 31c, the gate electrode 45c, for example, is made of the metallic material such as aluminum. In this case, as shown in FIG. 19, the gate electrode 45c is formed above the surface of the glass substrate 201g so as to face the channel region 48Cc of the semiconductor layer 48c through the gate insulating film 46zc.

In addition, in the third TFT 31c, as shown in FIG. 19, the gate insulating film 46zc, for example, is made from a silicon oxide film, and is formed so as to be interposed between the channel region 48Cc of the semiconductor layer 48c and the gate electrode 45c.

In addition, in the third TFT 31c, the semiconductor layer 48c, for example, is made of polysilicon. In the semiconductor layer 48c, as shown in FIG. 19, the channel region 48Cc is formed so as to correspond to the gate electrode 45c. In this case, the channel region 48Cc is formed so as to face the light shielding layer SYc through the insulating film 46 obtained by laminating the silicon oxide film 46gb on the silicon nitride film 46ga. Also, in the semiconductor layer 48c, a pair of source/drain regions 48Ac and 48Bc is formed so as to sandwich the channel region 48Cc between the source/drain regions 48Ac and 48Bc. In the pair of source/drain regions 48Ac and 48Bc, a pair of low impurity concentrated regions 48ALc and 48BLc is formed so as to sandwich the channel region 48Cc between the low impurity concentrated regions 48ALc and 48BLc. Moreover, a pair of high impurity concentrated regions 48AHc and 48BHc having higher impurity concentrations than those of the low impurity concentrated regions 48ALc and 48BLc are formed so as to sandwich the pair of low impurity concentrated regions 48ALc and 48BLc between the high impurity concentrated regions 48AHc and 48BHc. In this case, the semiconductor layer 48c is doped with n-type impurity ions to form a pair of source/drain regions 48Ac and 48Bc, thereby forming the third TFT 31c as an N-channel TFT.

Also, the fourth TFT 31d composing the peripheral circuit element SK, as shown in FIG. 19, has the top-gate structure similarly to the case of the third TFT 31c. The fourth TFT 31d includes a light shielding layer SYd, a gate electrode 45d, a gate insulating film 46zd, and a semiconductor layer 48d, and is formed as a P-channel TFT.

In the fourth TFT 31d, the light shielding layer SYd, for example, is made of a metallic material such as molybdenum on the glass substrate 201g similarly to the case of the light shielding layer SYc of the third TFT 31c. The light shielding layer SYd light-shields a light made incident thereto from the back surface side of the liquid crystal panel 200. In this case, as shown in FIG. 19, light shielding layer SYd is provided on the surface of the glass substrate 201g so as to face a channel region 48Cd of a semiconductor layer 48d through the insulating film 46.

In addition, in the fourth TFT 31d, the gate electrode 45d, for example, is made of the metallic material such as aluminum similarly to the case of the gate electrode 45c of the third TFT 31c. In this case, as shown in FIG. 19, the gate electrode 45d is formed above the surface of the glass substrate 201g so as to face the channel region 48Cd of the semiconductor layer 48d through the gate insulating film 46zd.

In addition, in the fourth TFT 31d, as shown in FIG. 19, the gate insulating film 46zd, for example, is made from the silicon oxide film similarly to the case of the gate insulating film 46zc of the third TFT 31c, and is formed so as to be interposed between the channel region 48Cd of the semiconductor layer 48d and the gate electrode 45d.

In addition, in the fourth TFT 31d, the semiconductor layer 48d, for example, is made of polysilicon similarly to the case of the semiconductor layer 48c of the first TFT 31c. In the semiconductor layer 48d, as shown in FIG. 19, the channel region 48Cd is formed so as to correspond to the gate electrode 45d. In this case, the channel region 48Cd is formed so as to face the light shielding layer SYd through the insulating film 46 obtained by laminating the silicon oxide film 46gb on the silicon nitride film 46ga. Also, in the semiconductor layer 48d, a pair of source/drain regions 48Ab and 48Bd is formed so as to sandwich the channel region 48Cd between the source/drain regions 48Ad and 48Bd. In the pair of source/drain regions 48Ad and 48Bd, a pair of low impurity concentrated regions 48ALd and 48BLd is formed so as to sandwich the channel region 48Cd between the low impurity concentrated regions 48ALd and 48BLd. Moreover, a pair of high impurity concentrated regions 48AHd and 48BHd having higher impurity concentrations than those of the low impurity concentrated regions 48ALd and 48BLd are formed so as to sandwich the pair of low impurity concentrated regions 48ALd and 48BLd between the high impurity concentrated regions 48AHd and 48BHd. In this case, the semiconductor layer 48d is doped with p-type impurity ions to form a pair of source/drain regions 48Ad and 48Bd, thereby forming the third TFT 31c as a P-channel TFT.

In the peripheral circuit element SK, as shown in FIG. 19, the semiconductor layer 48c of the third TFT 31c, and the semiconductor layer 48d of the fourth TFT 31d are formed integrally with each other. Also, the source/drain region 48Bc of the third TFT 31c, and the source/drain region 48Ad of the fourth TFT 31d are formed adjacent to each other to be electrically connected to each other.

Also, in the peripheral circuit element SK, an electrode 53c and an electrode 54d paired with each other are provided in the third TFT 31c and the fourth TFT 31d, respectively. Here, one electrode 53c is provided so as to be electrically connected to the source/drain region 48Ac different from the source/drain region 48Bc connected to the fourth TFT 31d in the third TFT 31c. In addition, the other electrode 54d is provided so as to be electrically connected to the source/drain region 48Bd different from the source/drain region 48Ad connected to the third TFT 31c in the fourth TFT 31d. In this case, each of the electrode 53c and the electrode 54d paired with each other is made of a conductive material such as aluminum.

As has been described, in Embodiment 4, the pixel switching element 31, the light receiving element 32, and the peripheral circuit element SK are different in structures thereof from those in Embodiment 1. However, in Embodiment 3, similarly to the case of Embodiment 1, although the insulating film 60b is formed on the surface of the planarizing film 60a in the sensor area SA having the light receiving element 32 provided therein in the pixel area PA, the dry etching processing for removing the insulating film 60b formed on the surface of the planarizing film 60a in the sensor area SA is not carried out, and thus the insulating film 60b is left on the planarizing film 60a.

Therefore, according to Embodiment 4 of the present invention, the optical sensitivity of the light receiving element 32 is enhanced, and thus it is possible to suppress occurrence of the dark current similarly to the case of Embodiment 1.

In addition, in Embodiment 4, the double-gate TFT is used as the pixel switching element 31. For this reason, in Embodiment 4, it is possible to reduce the leakage current generated in the pixel switching element 31.

In Embodiment 4, after the polysilicon film is deposited so as to cover the areas in which the semiconductor elements are intended to be formed, respectively, the polysilicon film is patterned so as to correspond to the pattern shape of the semiconductor layer composing the semiconductor elements, thereby manufacturing the semiconductor elements. For this reason, when the semiconductor layer 47 of the light receiving element 32 is thickened in order to enhance the sensitivity at which the infrared light IR is received by the light receiving element 32, each of the semiconductor layers 48a and 48b of the pixel switching element 31 is thickened accordingly. As a result, the leakage current remarkably increases in the pixel switching element 31 in some cases. In Embodiment 4, however, the effect can be suitably offered such that it is possible to reduce the leakage current generated in the pixel switching element 31 because as described above, the double-gate TFT is used as the pixel switching element 31.

Embodiment 5

Hereinafter, Embodiment 5 of the present invention will be described in detail.

Figure 20:
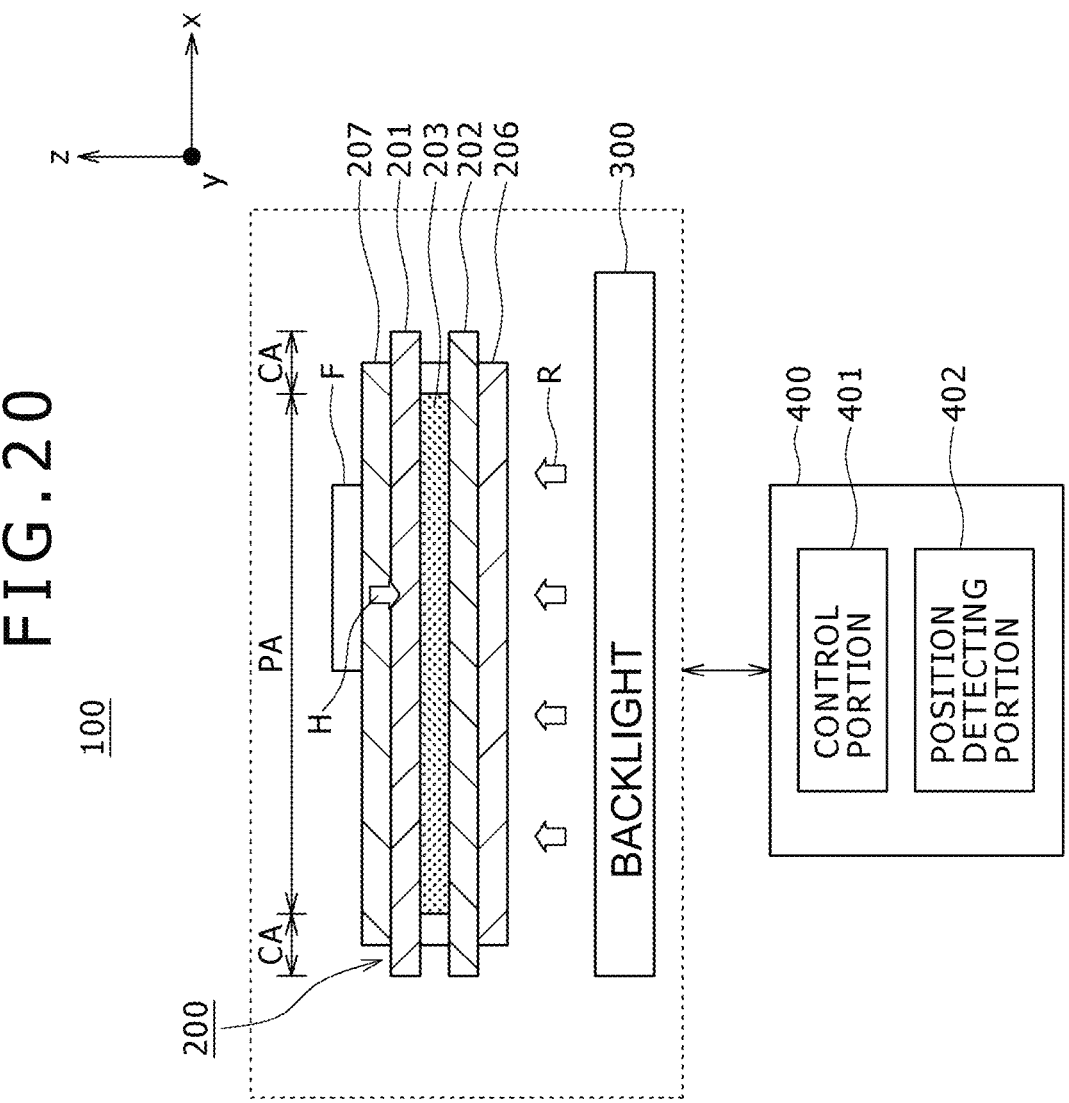
FIG. 20 is a cross sectional view, partly in block, showing a structure of a liquid crystal display device according to Embodiment 5 of the present invention.
Figure 21:
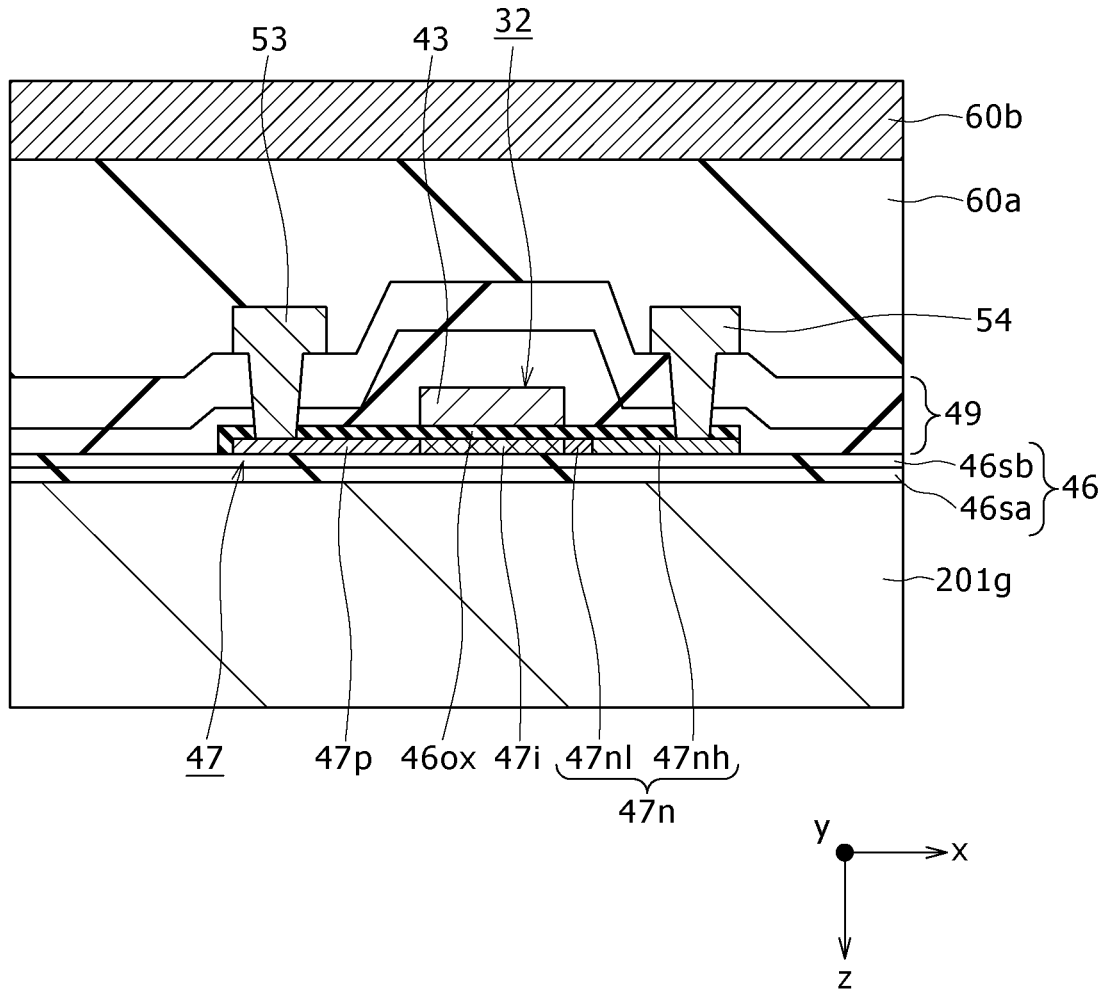
FIG. 21 is a cross sectional view showing a sensor area having a light receiving element provided therein in a pixel area in the liquid crystal display device according to Embodiment 5 of the present invention.

FIG. 20 is a cross sectional view, partly in block, showing a structure of a liquid crystal display device 100 according to Embodiment 5 of the present invention. Also, FIG. 21 is a cross sectional view showing the sensor area SA having the light receiving element 32 provided therein in the pixel area PA in the liquid crystal display device 100 according to Embodiment 5 of the present invention.

The liquid crystal display device 100 according to Embodiment 5 of the present invention is similar to that of Embodiment 4 except that the liquid crystal panel 200 is different in disposition for the backlight 300 from that in Embodiment 4 as shown in FIG. 20, and the light receiving element 32 provided in the sensor area SA is different in structure from that in Embodiment 4. For this reason, a description of any of repeated portions is omitted here for the sake of simplicity.

In the liquid crystal display device 100 of Embodiment 5, as shown in FIG. 20, the liquid crystal panel 200 includes the TFT array substrate 201, the counter substrate 202, and the liquid crystal layer 203.

In the liquid crystal panel 200, the TFT array substrate 201 and the counter substrate 202 face each other so as to leave a space between them similarly to the case of Embodiment 4. Also, the liquid crystal layer 203 is disposed so as to be sandwiched between the TFT array substrate 201 and the counter substrate 202.

In Embodiment 5, however, unlike Embodiment 4, as shown in FIG. 20, in the liquid crystal panel 200, the backlight 300 is disposed so as to be located on the side of the counter substrate 202. Thus, the radiation lights R emitted from the backlight 300 are radiated to the surface, of the counter substrate 202, opposite to the surface of the counter substrate 202 facing the TFT array substrate 201.

That is to say, in Embodiment 5, as shown in FIG. 20, the liquid crystal panel 200 is disposed in a way that the TFT array substrate 201 is located on the front surface side, and the counter substrate 202 is located on the back surface side.

As shown in FIG. 21, the light receiving element 32 has the top-gate structure, and includes the gate electrode 43, the gate insulating film 46ox, and the semiconductor layer 47. In Embodiment 5, unlike Embodiment 4, the light receiving element 32 is provided with no light shielding layer SY. Also, unlike Embodiment 4, the gate electrode 43 is formed so as to cover the entire surface of the i layer 47i of the semiconductor layer 47. The gate insulating film 46 ×and the semiconductor layer 47 are formed in the same manner as that in Embodiment 4. Also, the light receiving element 32 receives the light made incident thereto from the side of the glass substrate 201g, thereby generating the data on the received lights.

As has been described, Embodiment 5 is different from Embodiment 4 in the disposition of the liquid crystal panel 200 with respect to the backlight 300 and in the structure of the light receiving element 32. In Embodiment 5, however, similarly to the case of Embodiment 4, although the insulating film 60b is formed on the surface of the planarizing film 60a in the sensor area SA having the light receiving element 32 provided therein in the pixel area PA, the dry etching processing for removing the insulating film 60b formed on the surface of the planarizing film 60a in the sensor area SA is not carried out, and thus the insulating film 60b is left on the planarizing film 60a.

Therefore, according to Embodiment 5 of the present invention, the optical sensitivity of the light receiving element 32 is enhanced, and thus it is possible to suppress occurrence of the dark current similarly to the case of Embodiment 4.

The present invention is by no means limited to Embodiments 1 to 5 described above in implementing the present invention, and various changes can be adopted.

For example, although in each of Embodiments 1 to 5, the description has been given with respect to the case where the present invention is applied to the liquid crystal panel utilizing the FFS system, the present invention is by no means limited thereto. For example, the present invention can also be applied to the liquid crystal panel utilizing the IPS system.

In addition, although in each of Embodiments 1 to 5, the description has been given with respect to the case where the semiconductor layer composing the semiconductor elements such as the pixel switching element is made of polysilicon, the present invention is by no means limited thereto. For example, the semiconductor layer may also be made of any other suitable semiconductor material such as amorphous silicon.

In addition, although in each of Embodiments 1 to 5, the description has been given with respect to the case where the light receiving element 32 is composed of the PIN type photodiode, the present invention is by no means limited thereto. For example, the same effect as that of the above case can be offered even when a photodiode, having a PDN structure, in which an i layer is doped with impurity ions is formed as the light receiving element 32. In addition, the photodiode composing the light receiving element 32 may also have a double-side gate structure in which gate electrodes are formed on both surfaces of the semiconductor layer, respectively.

In addition, although in each of Embodiments 1 to 5, the description has been given with respect to the case where the radiation lights are radiated so as to contain therein the infrared light as the invisible light, the present invention is by no means limited thereto. For example, the radiation lights may also be radiated so as to contain therein the ultraviolet light as the invisible light.

In addition, although in each of Embodiments 1 to 5, the description has been given with respect to the case where a plurality of light receiving elements 32 are provided so as to correspond to a plurality of pixels P, respectively, the present invention is by no means limited thereto. For example, one light receiving element 32 may also be provided so as to correspond to a plurality of pixels P. Contrary to this, a plurality of light receiving elements 32 may also be provided so as to correspond to one pixel P.

In addition, the liquid crystal display device 100 of any one of Embodiments 1 to 5 can be applied as a device for use in various electronic apparatuses.

FIGS. 22 to 26 are respectively schematic views showing electronic apparatuses to each of which the liquid crystal display device 100 according to any one of Embodiments 1 to 5 of the present invention is applied.

Figure 22:
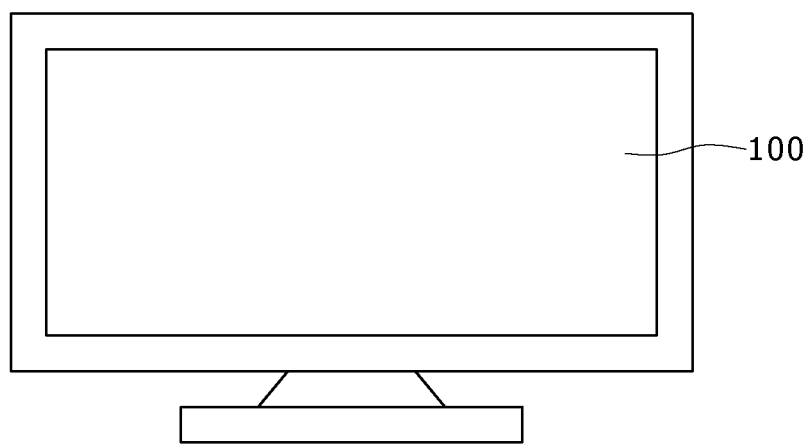
FIG. 22 is a schematic view showing a television set as an electronic apparatus to which the liquid crystal display device according to any one of Embodiments 1 to 5 of the present invention is applied.

As shown in FIG. 22, the liquid crystal display device 100 can be applied as the display device which displays an image corresponding to a video signal of a television broadcasting on a display screen thereof, and to which a manipulation command is inputted from an operator in a television set for receiving and displaying the television broadcasting.

Figure 23:
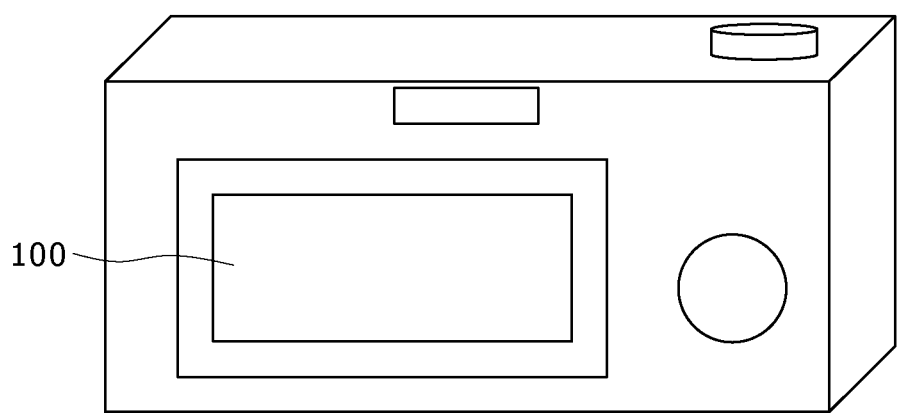
FIG. 23 is a schematic view showing a digital still camera as another electronic apparatus to which the liquid crystal display device according to any one of Embodiments 1 to 5 of the present invention is applied.

In addition, as shown in FIG. 23, the liquid crystal display device 100 can be applied as the display device which displays an image such as a captured image on a display screen thereof, and to which a manipulation command is inputted from an operator in a digital still camera.

Figure 24:
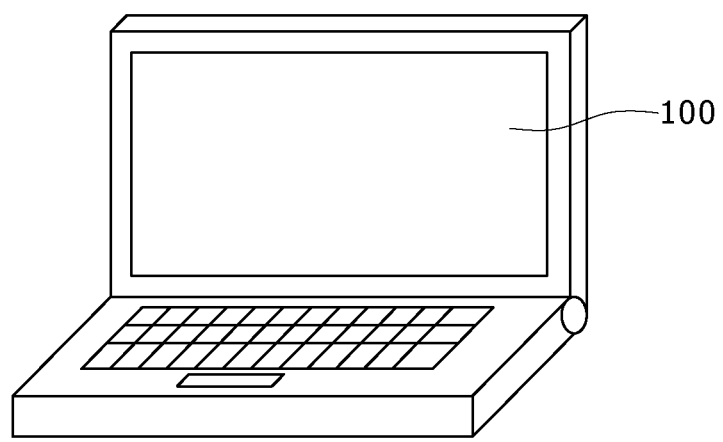
FIG. 24 is a schematic view showing a notebook-size personal computer as still another electronic apparatus to which the liquid crystal display device according to any one of Embodiments 1 to 5 of the present invention is applied.

In addition, as shown in FIG. 24, the liquid crystal display device 100 can be applied as the display device which displays a display image such as a manipulation image, and to which a manipulation command is inputted from an operator in a notebook-size personal computer.

Figure 25:
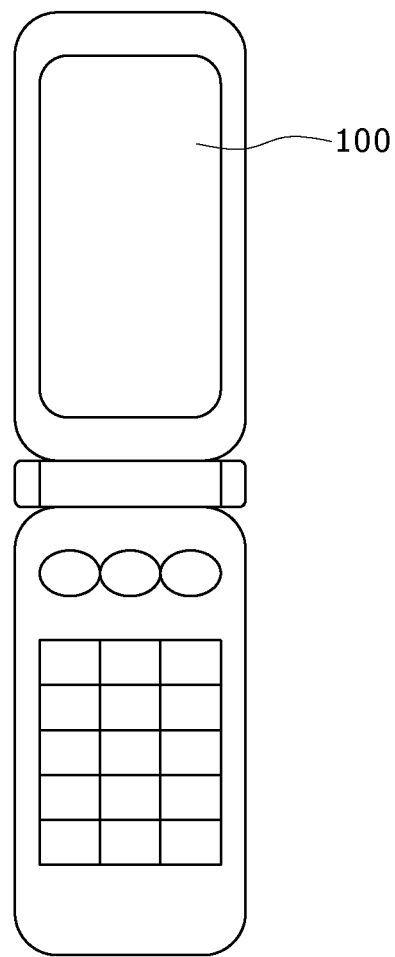
FIG. 25 is a schematic view showing mobile terminal equipment as yet another electronic apparatus to which the liquid crystal display device according to any one of Embodiments 1 to 5 of the present invention is applied.

In addition, as shown in FIG. 25, the liquid crystal display device 100 can be applied as the display device which displays a display image such as a manipulation image, and to which a manipulation command is inputted from an operator in mobile terminal equipment.

Figure 26:
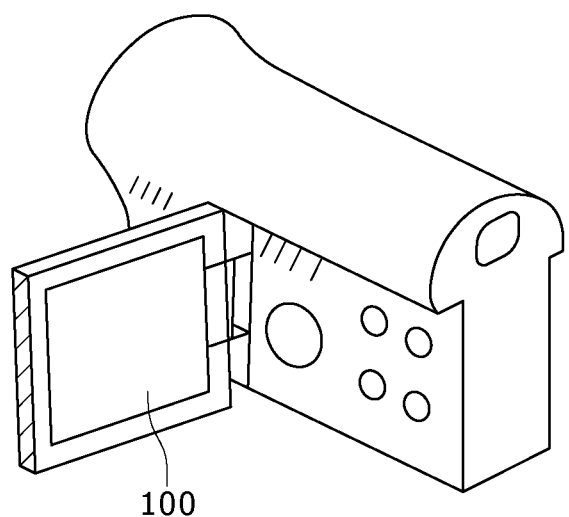
FIG. 26 is a schematic view showing a video camera as a further electronic apparatus to which the liquid crystal display device according to any one of Embodiments 1 to 5 of the present invention is applied.

Also, as shown in FIG. 26, the liquid crystal display device 100 can be applied as the display device which displays a display image such as a manipulation image, and to which a manipulation command is inputted from an operator in a video camera.

Note that, in each of Embodiments 1 to 5 described above, the liquid crystal display device 100 corresponds to the display device according to an embodiment of the present invention. In addition, in each of Embodiments 1 to 5 described above, the liquid crystal panel 200 corresponds to the display panel according to an embodiment of the present invention. In addition, in each of Embodiments 1 to 5 described above, the TFT array substrate 201 corresponds to the first substrate according to an embodiment of the present invention. In addition, in each of Embodiments 1 to 5 described above, the counter substrate 202 corresponds to the second substrate according to an embodiment of the present invention. In addition, in each of Embodiments 1 to 5 described above, the liquid crystal layer 203 corresponds to the liquid crystal layer according to an embodiment of the present invention. In addition, in each of Embodiments 1 to 5 described above, the backlight 300 corresponds to the radiating portion according to an embodiment of the present invention. In addition, in each of Embodiments 1 to 5 described above, the position detecting portion 402 corresponds to the position detecting portion according to an embodiment of the present invention. In addition, in each of Embodiments 1 to 5 described above, the pixel switching element 31 corresponds to the pixel switching element according to an embodiment of the present invention. Also, in each of Embodiments 1 to 5 described above, the light receiving element 32 corresponds to the light receiving element according to an embodiment of the present invention. Also, in each of Embodiments 1 to 5 described above, the planarizing film 60a corresponds to the planarizing film according to an embodiment of the present invention. Also, in each of Embodiments 1 to 5 described above, the insulating film 60b corresponds to the insulating film according to an embodiment of the present invention. Also, in each of Embodiments 1 to 5 described above, the common electrode 62a corresponds to the common electrode or the first electrode according to an embodiment of the present invention. Also, in each of Embodiments 1 to 5 described above, the pixel electrode 62b corresponds to the pixel electrode or the second electrode according to an embodiment of the present invention. Also, in each of Embodiments 1 to 5 described above, the pixel area PA corresponds to the pixel area according to an embodiment of the present invention. Also, in each of Embodiments 1 to 5 described above, the pixel P corresponds to the pixel according to an embodiment of the present invention. Moreover, in each of Embodiments 1 to 5 described above, the sensor area SA corresponds to the sensor area according to an embodiment of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A method of manufacturing a liquid crystal display device including a liquid crystal panel comprising the steps of:
   providing (a) a first substrate, (b) a second substrate facing said first substrate, (c) a liquid crystal layer disposed between said first substrate and said second substrate, (d) providing a pixel area on a surface side of said first substrate facing said second substrate, and (e) providing first and second electrodes each configured to apply a transverse electric field to said liquid crystal layer in said pixel area;
   forming a light receiving element configured to (a) receive an incident light from a side of said second substrate to a side of said first substrate through said liquid crystal layer in said pixel area on a light receiving surface thereof, and (b) form data on the light receiving surface;
   forming a planarizing film over said light receiving element in said pixel area, said planarizing film comprising an organic layer over an inorganic layer; and
   forming an insulating film between said first and second electrodes in said pixel area on the surface of said first substrate facing said second substrate,
   wherein,
   in the step of forming said insulating film, said insulating film is formed on a surface of said planarizing film in an area corresponding to a sensor area having said light receiving element provided therein, and an etching processing for removing said insulating film formed on the surface of said planarizing film in said sensor area is not carried out.

* * * * *